US010439252B2

(12) United States Patent
Watahiki et al.

(10) Patent No.: US 10,439,252 B2
(45) Date of Patent: Oct. 8, 2019

(54) ELECTROLYTE SOLUTION FOR ELECTROCHEMICAL DEVICE, AND ELECTROCHEMICAL DEVICE

(71) Applicant: WAKO PURE CHEMICAL INDUSTRIES, LTD., Osaka-shi, Osaka (JP)

(72) Inventors: Tsutomu Watahiki, Kawagoe (JP); Takahiro Kiyosu, Kawagoe (JP); Kazuhiko Sato, Kawagoe (JP); Goro Mori, Kawagoe (JP); Kuniaki Okamoto, Kawagoe (JP)

(73) Assignee: FUJIFILM Wako Pure Chemical Corporation, Osaka (JP)

( * ) Notice: Subject to any disclaimer, the term of this patent is extended or adjusted under 35 U.S.C. 154(b) by 0 days.

(21) Appl. No.: 14/762,578

(22) PCT Filed: Jan. 22, 2014

(86) PCT No.: PCT/JP2014/051302
§ 371 (c)(1),
(2) Date: Jul. 22, 2015

(87) PCT Pub. No.: WO2014/115784
PCT Pub. Date: Jul. 31, 2014

(65) Prior Publication Data
US 2015/0364792 A1 Dec. 17, 2015

(30) Foreign Application Priority Data
Jan. 25, 2013 (JP) ................................. 2013-012281

(51) Int. Cl.
*H01M 10/0566* (2010.01)
*H01M 10/0569* (2010.01)
*H01M 10/054* (2010.01)
*H01M 10/0568* (2010.01)

(52) U.S. Cl.
CPC ..... *H01M 10/0566* (2013.01); *H01M 10/054* (2013.01); *H01M 10/0568* (2013.01); *H01M 10/0569* (2013.01); *H01M 2300/0028* (2013.01)

(58) Field of Classification Search
CPC .......... H01M 10/054; H01M 10/0566; H01M 10/0567; H01M 10/0568; H01M 10/0569; H01M 2300/0028
See application file for complete search history.

(56) References Cited

U.S. PATENT DOCUMENTS 6,045,950 A * 4/2000 Chang ............... H01M 10/0569
429/306
6,316,141 B1 11/2001 Aurbach et al.
6,426,164 B1 * 7/2002 Yamaura ............... H01M 4/381
429/223

(Continued)

FOREIGN PATENT DOCUMENTS

| CN | 102064344 | * | 5/2011 |
|----|-----------|---|--------|
| JP | 2003-512704 A | | 4/2003 |
| JP | 2004-259650 A | | 9/2004 |
| JP | 2007-188694 A | | 7/2007 |
| JP | 2007-188709 A | | 7/2007 |

(Continued)

OTHER PUBLICATIONS

Machine translation of CN 102064344, published on May 18, 2011 (Year: 2011).*
International Search Report dated Apr. 28, 2014, issued in counterpart application No. PCT/JP2014/051302 (1 page).
Aurbach, et al., "Prototype systems for rechargeable magnesium batteries", Nature, Oct. 12, 2000, vol. 407, pp. 724-727, cited in specification.
Shiraga, et al., "Electrochemical characteristics of negative electrode for metal magnesium rechargeable battery, in ether-type electrolyte", Proceedings, New Battery Concept Subcommittee, 2011, pp. 1-5, w/English Abstract, cited in specification.

(Continued)

*Primary Examiner* — Anca Eoff
(74) *Attorney, Agent, or Firm* — Westerman, Hattori, Daniels & Adrian, LLP

(57) ABSTRACT

It is an object of the present invention to provide an electrochemical device having an electrolytic solution having high current density, as well as high safety, where dissolution and deposition of magnesium progress repeatedly and stably. Furthermore, the present invention relates to an electrolytic solution for an electrochemical device, comprising (1) a supporting electrolyte comprising a magnesium salt, and (2) at least one or more kinds of the compound represented by following general formula (I)

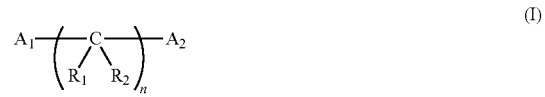

(wherein n represents an integer of 0 to 6, and n pieces of $R_1$ and n pieces of $R_2$ each independently represent a hydrogen atom, an alkyl group having 1 to 6 carbon atoms, or a halogenoalkyl group having 1 to 6 carbon atoms. $A_1$ and $A_2$ each independently represent —C(=O)—$R_3$, —O—$R_5$, —N($R_4$)—$R_3$, —S—$R_3$, —C(=O)—$OR_3$, —O—C(=O)—$R_3$, —C(=O)—N($R_4$)—$R_3$, —N($R_4$)—C(=O)—$R_3$, —$SO_2$—$R_3$, —N($R_4$)—$SO_2$—$R_3$, —O—B($OR_5$)$_2$, —O—P(=O)($OR_5$)$_2$, —CN, a monocyclic heterocyclic group, a group derived from cyclic acetal, a group derived from a cyclic carbonate ester, a group derived from a cyclic carboxylate ester).

15 Claims, 6 Drawing Sheets

(56) References Cited

U.S. PATENT DOCUMENTS

| | | | |
|---|---|---|---|
| 2001/0049060 A1 | 12/2001 | Aurbach et al. | |
| 2004/0137324 A1* | 7/2004 | Itaya | H01M 4/505 429/188 |
| 2008/0102377 A1* | 5/2008 | Abe | H01M 6/164 429/338 |
| 2008/0153006 A1* | 6/2008 | Oh | H01M 10/0525 429/332 |
| 2011/0143215 A1* | 6/2011 | Andou | H01M 10/0525 429/325 |
| 2011/0250509 A1 | 10/2011 | Yamaguchi et al. | |
| 2013/0089778 A1* | 4/2013 | Ihara | H01M 10/0569 429/200 |
| 2015/0079464 A1* | 3/2015 | Kodama | H01M 10/0567 429/188 |
| 2015/0086876 A1* | 3/2015 | Taeda | H01M 10/0525 429/332 |

FOREIGN PATENT DOCUMENTS

| | | | |
|---|---|---|---|
| JP | 2010-044957 A | | 2/2010 |
| JP | 2012-142196 A | | 7/2012 |
| JP | 5278582 B1 | | 9/2013 |
| WO | WO 01/09972 | * | 2/2001 |
| WO | WO 2013/157504 | * | 10/2013 |
| WO | WO 2013/176123 | * | 11/2013 |

OTHER PUBLICATIONS

Yoshimoto, et al, "Magnesium rechargeable battery", Future Material, 2011, vol. 62, No. 4, pp. 211-216, w/English Abstract, cited in specification.

International Preliminary Report on Patentability (Form PCT/IB/373) issued in counterpart International Application No. PCT/JP2014/051302 dated Jul. 28, 2015, with Form PCT/ISA/237. (8 pages).

* cited by examiner

ELECTROLYTE SOLUTION FOR ELECTROCHEMICAL DEVICE, AND ELECTROCHEMICAL DEVICE

TECHNICAL FIELD

The present invention relates to an electrolytic solution containing magnesium ions and an electrochemical device comprising said electrolytic solution.

BACKGROUND ART

Magnesium to be used as a raw material of a magnesium ion battery is an element present abundantly on the earth, and is a material having higher superiority as compared with lithium which is unstable in price and supply amount, or the like. In addition, since the magnesium ion battery is cheap and safe, as well as has high energy density, it has drawn attention as a post-lithium ion battery.

As a negative electrode of the magnesium ion battery, usually metal magnesium is used. However, since metal magnesium has high reducibility, in the case where said metal is used as a negative electrode, it reacts with an electrolytic solution to form a passive state film having low ion conductivity, at the electrode surface thereof. And, there has been known that formation of this passive state film inhibits reversible dissolution and deposition of magnesium, which has been a problem on using metal magnesium as a negative electrode.

On the other hand, an electrolytic solution not forming the passive state film has also been known. For example, in PATENT LITERATURE 1 and NON PATENT LITERATURE 1, there has been reported that by using an electrolytic solution, where an electrolyte represented by the general formula $Mg(ZR^1{}_1R^2{}_mX_n)_2$ (wherein Z represents boron or aluminum; $R^1$ and $R^2$ represent a hydrocarbon group; X represents bromine or chlorine; and l+m+n is 4) is dissolved in tetrahydrofuran (THF), reversible dissolution and deposition of magnesium is possible.

Additionally, various reports have been made aiming at enhancing performance of the magnesium ion battery. For example, PATENT LITERATURE 2, there has been reported that low oxidation potential conventionally said for the Grignard's reagent (RMgX, wherein R is an alkyl group) can be improved by using an electrolytic solution of an aromatic Grignard's reagent represented by the general formula $C_6H_5MgX$ (wherein X=Cl, Br) dissolved in tetrahydrofuran (THF).

In addition, in PATENT LITERATURE 3 and PATENT LITERATURE 4, there has been reported that by using the Grignard's reagent (RMGX) or magnesium (II) chloride in combination with an organometal compound (an alkylaluminum compound), a complex is formed by making magnesium dimerized in the system, and oxidation resistance of an electrolytic solution can be improved.

Still more, in NON PATENT LITERATURE 2, there has been a description on the progress of reversible dissolution and deposition of magnesium, from the result of cyclic voltammogram and electrode surface analysis, by preparation of an electrolytic solution wherein a magnesium (II) bromide is dissolved in 2-methyltetrahydrofuran in order to enhance safety of the electrolytic solution.

CITATION LIST

Patent Literature

PATENT LITERATURE 1: JP-A-2003-512704
PATENT LITERATURE 2: JP-A-2004-259650
PATENT LITERATURE 3: JP-A-2007-188694
PATENT LITERATURE 4: JP-A-2007-188709

Non Patent Literature

NON PATENT LITERATURE 1: D. Aurbach et al., Nature, vol. 407, p. 724 to 727 (2000)
NON PATENT LITERATURE 2: Proceedings (2011), No. 76$^{th}$ New Battery Concept Subcommittee, p. 1 to 5
NON PATENT LITERATURE 3: Future Material, vol. 62, p. 211 to 216 (2011)

SUMMARY OF INVENTION

Technical Problem

However, any of the electrolytic solutions described in the above-described literature has a low current value (or current density) of ±1 mA or lower (or ±1 mA/cm$^2$ or lower), which is observed in association with dissolution and deposition of magnesium, thus results in requiring long period of time in carrying out charge-discharge of a battery. That is, it cannot be said a battery with high practicality, due to difficulty of rapid charge-discharge. For example, in PATENT LITERATURE 4, a current value associated with dissolution of magnesium is 0.8 mA, and a current value associated with deposition of magnesium is −0.6 mA, which cannot be said to be sufficiently high values.

In addition, an electrolytic solution being used in PATENT LITERATURE 1 and NON PATENT LITERATURE 1 starts decomposition when applied with a voltage of about 2.3 V, therefore it cannot be applied a charge-voltage of 2.3 V or higher. Still more, in PATENT LITERATURE 2, there has been described that oxidative decomposition potential of a phenylmagnesium bromide ($C_6H_5MgX$) is 3.8 V, however, practically, in PATENT LITERATURE 4, there has been a description that it starts decomposition at further low potential (about 2.0 V).

Thus, such a problem is generated that high energy density, which the magnesium ion battery originally has, cannot be utilized sufficiently, because of limitation of charge-discharge voltage depending on decomposition potential of the electrolytic solution.

Another factor regarded as important, in the case of using as a practical battery, includes safety, for which the above-described electrolytic solution is insufficient. For example, magnesium aluminate (PATENT LITERATURE 1, NON PATENT LITERATURE 1) is a water-reactive substance classified in Category III of hazardous materials, and the Grignard's reagent (PATENT LITERATURE 2) is an organometal compound having strong inflammability, which remains a problem on safety of the electrolytic solution.

In addition, PATENT LITERATURE 3 and PATENT LITERATURE 4 use triethylaluminum and diethylaluminum chloride, respectively, as raw materials, which are converted to a magnesium-aluminum complex within the system, however, since each of the raw materials is a spontaneously combustible substance, they cannot be said to have high safety.

Accordingly, in order to solve the above-described problems, it is an object of the present invention to provide an electrochemical device having an electrolytic solution having high current density, as well as high safety, where dissolution and deposition of magnesium progress repeatedly and stably.

Solution to Problem

The present invention relates to an electrolytic solution for an electrochemical device comprising: (1) a supporting electrolyte comprising a magnesium salt; and (2) at least one or more kinds of the compound represented by following general formula (I)

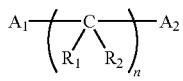

[wherein n represents an integer of 0 to 6, n pieces of $R_1$ and n pieces of $R_2$ each independently represent a hydrogen atom, an alkyl group having 1 to 6 carbon atoms, or a halogenoalkyl group having 1 to 6 carbon atoms. $A_1$ and $A_2$ each independently represent —C(=O)—$R_3$, —O—$R_5$, —N($R_4$)—$R_3$, —S—$R_3$, —C(=O)—O$R_3$, —O—C(=O)—$R_3$, —C(=O)—N($R_4$)—$R_3$, —N($R_4$)—C(=O)—$R_3$, —SO$_2$—$R_3$, —N($R_4$)—SO$_2$—$R_3$, —O—B(O$R_5$)$_2$, —O—P(=O)(O$R_5$)$_2$, —CN, a monocyclic heterocyclic group, a group derived from a cyclic acetal, a group derived from a cyclic carbonate ester, or a group derived from a cyclic carboxylate ester (the $R_3$ each represents a hydrogen atom, an alkyl group having 1 to 6 carbon atoms, a halogenoalkyl group having 1 to 6 carbon atoms, an aryl group having 6 to 10 carbon atoms, or an aralkyl group having 7 to 13 carbon atoms, $R_4$ each represents a hydrogen atom, an alkyl group having 1 to 6 carbon atoms, a halogenoalkyl group having 1 to 6 carbon atoms, or an aralkyl group having 7 to 13 carbon atoms, $R_5$ each represents an alkyl group having 1 to 6 carbon atoms, a halogenoalkyl group having 1 to 6 carbon atoms, an alkoxyalkyl group having 3 to 8 carbon atoms, an aryl group having 6 to 10 carbon atoms, or an aralkyl group having 7 to 13 carbon atoms), a cyclic structure may be formed between $A_1$ and $A_2$, through carbon atom between $A_1$ and $A_2$, or through carbon atom between $A_1$ and $R_1$].

Advantageous Effects of Invention

According to the present invention, a practical electrochemical device capable of attaining rapid charge-discharge can be provided, because dissolution and deposition of magnesium progress repeatedly and stably, and it has higher current density of at least over ±1 mA, as compared with a conventional electrolytic solution, as well as very small ion diffusion resistance. Still more, the present invention is capable of preparing a magnesium ion battery having superior in cycle characteristics, where dissolution and deposition of magnesium progress stably, even after 100 cycles. In addition, the present invention is capable of providing an electrolytic solution having high safety, because of using a simple magnesium salt as a supporting electrolyte, without using a water-reactive compound or an organometal compound having inflammability.

DESCRIPTION OF EMBODIMENTS

1. Supporting Electrolyte

Figure 1:
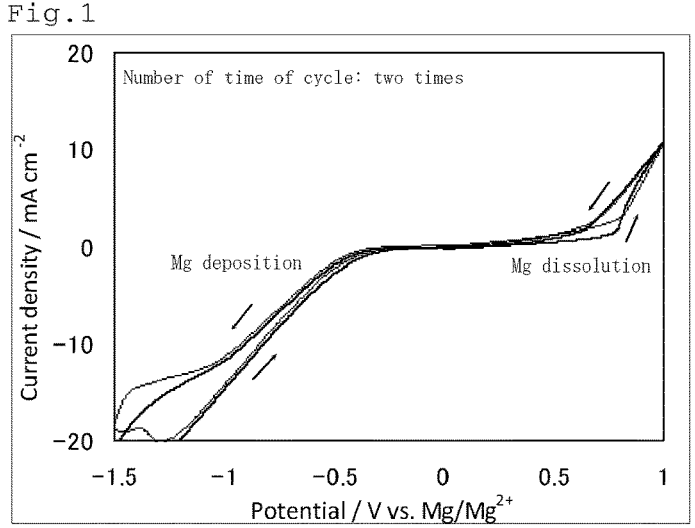
FIG. 1 is a graph showing CV measurement result using the electrolytic solution 1 (Mg(TFSI)$_2$/acetylacetone solution) in Example 25.

A supporting electrolyte pertaining to the present invention may comprise a magnesium salt, and specifically, for example, includes the one comprised of at least one kind selected from magnesium salts represented by following general formula (II).

$$MgX_q \quad (II)$$

[wherein Mg represents magnesium ion, q represents 1 or 2, when q is 1, X represents oxide ion (O$^{2-}$), sulfide ion (S$^{2-}$), sulfate ion (SO$_4^{2-}$), hydrogen phosphate ion (HPO$_4^{2-}$), or carbonate ion (CO$_3^{2-}$), which is a divalent anion, and when q is 2, X represents a perfluoroalkanesulfonate ion having 1 to 4 carbon atoms, a bis(perfluoroalkanesulfonyl)imide ion represented by general formula (III),

(wherein k represents an integer of 1 to 4, F represents fluorine atom), a bis(perfluoroalkanesulfonyl)methide ion represented by following formula (IV),

(IV)

[wherein r represents an integer of 1 to 4, $R_6$ represents an alkyl group having 1 to 4 carbon atoms, or a $-SO_2-C_rF_{2r+1}$ group (r is the same as the above-described one)], a bis(fluorosulfonyl)imide ion, an alkane sulfonate ion having 1 to 4 carbon atoms, an arene sulfonate ion having 6 to 10 carbon atoms, a perfluoroalkane carboxylate ion having 2 to 5 carbon atoms, an alkane carboxylate ion having 2 to 5 carbon atoms, an arene carboxylate ion having 7 to 11 carbon atoms, an alkoxide ion having 1 to 4 carbon atoms, permanganate ion, perchlorate ion, tetraphenylborate ion, tetrafluoroborate ion, hexafluorophosphate ion, hexafluoroarsenate ion, nitrate ion, dihydrogen phosphate ion, hydrogen sulfate ion, hydrogen carbonate ion, hydrogen sulfide ion, hydroxide ion (OH$^-$), thiocyanate ion, cyanide ion (CN$^-$), fluoride ion (F$^-$), chloride ion (Cl$^-$), bromide ion (Br$^-$), iodide ion (I$^-$), or hydride ion (H$^-$), which is a monovalent anion].

In the supporting electrolyte pertaining to the present invention, when it contains an Grignard's reagent, it reacts with functional group containing oxygen atom, sulfur atom, nitrogen atom, or the like, of the compound represented by general formula (I), resulting in decomposition of both the Grignard's reagent and the compound represented by general formula (I), and not functioning as an electrolytic solution, and thus the one not containing the Grignard's reagent is preferable. As the supporting electrolyte pertaining to the present invention, the group composing of only the magnesium salt represented by general formula (II) is particularly preferable.

q in General Formula (II) Represents 1 or 2, and 2 is Preferable.

X in general formula (II) represents a divalent anion when q is 1, and represents a monovalent anion when q is 2, and the monovalent anion is preferable.

The perfluoroalkane sulfonate ion having 1 to 4 carbon atoms represented by X, may be any of a straight chained, branched or cyclic one, and the straight chained one is preferable. Specifically, it includes, for example, trifluoromethanesulfonate ion, pentafluoroethanesulfonate ion, heptafluoropropanesulfonate ion, nonafluorobutanesulfonate ion, or the like, and trifluoromethanesulfonate ion is preferable.

k in general formula (III) represents an integer of 1 to 4, which is preferably 1 or 2, and more preferably 1.

Specific example of the bis(perfluoroalkanesulfonyl)imide ion represented by general formula (III) includes, for example, bis(trifluoromethanesulfonyl)imide ion, bis(pentafluoroethanesulfonyl)imide ion, bis(heptafluoropropanesulfonyl)imide ion, bis(nonafluorobutanesulfonyl)imide ion, or the like, and bis(trifluoromethanesulfonyl)imide ion, or the like, is preferable.

r in general formula (IV) and r in $R_6$ of general formula (IV) represent an integer of 1 to 4, which are preferably 1 or 2, and more preferably 1.

An alkyl group having 1 to 4 carbon atoms in $R_6$ of general formula (IV) includes, for example, a methyl group, an ethyl group, an n-propyl group, an isopropyl group, an n-butyl group, an isobutyl group, a tert-butyl group, or the like.

Specific example of bis(perfluoroalkanesulfonyl)methide ion represented by general formula (IV) includes, for example, bis(trifluoromethanesulfonyl)methide ion, bis(pentafluoroethanesulfonyl)methide ion, bis(heptafluoropropanesulfonyl)methide ion, bis(nonafluorobutanesulfonyl)methide ion, or the like, and bis(trifluoromethanesulfonyl)methide ion, or the like, is preferable.

An alkanesulfonate ion having 1 to 4 carbon atoms represented by X may be any of a straight chained, branched, or cyclic one, however the straight chained one is preferable. Specifically, it includes, for example, methanesulfonate ion, ethanesulfonate ion, n-propanesulfonate ion, isopropanesulfonate ion, cyclopropanesulfonate ion, n-butanesulfonate ion, or the like.

An arenesulfonate ion having 6 to 10 carbon atoms represented by X includes, for example, benzenesulfonate ion, naphthalenesulfonate ion, or the like.

A perfluoroalkanecarboxylate ion having 2 to 5 carbon atoms represented by X may be any of a straight chained, branched, or cyclic one, however, the straight chained one is preferable. Specifically, it includes, for example, trifluoroacetate ion, pentafluoropropionate ion, heptafluorobutyrate ion, nonafluoropentanoate ion, or the like.

An alkanecarboxylate ion having 2 to 5 carbon atoms represented by X may be any of a straight chained, branched, or cyclic one, however, the straight chained one is preferable. Specifically, it includes, for example, acetate ion, propionate ion, butyrate ion, isobutyrate ion, or the like.

An arenecarboxylate ion having 7 to 11 carbon atoms represented by X includes, for example, benzoate ion, naphthalenecarboxylate ion, or the like.

An alkoxide ion having 1 to 4 carbon atoms represented by X may be any of a straight chained, branched, or cyclic one, however, the straight chained one is preferable. Specifically, it includes, for example, methoxide ion, ethoxide ion, n-propoxide ion, isopropoxide ion, n-butoxide ion, isobutoxide ion, sec-butoxide ion, tert-butoxide ion, cyclopropoxide ion, cyclobutoxide ion, or the like.

Among the monovalent anions represented by X, a perfluoroalkanesulfonate ion having 1 to 4 carbon atoms, a bis(perfluoroalkanesulfonyl)imide ion represented by general formula (III), bis(fluorosulfonyl)imide ion, a perfluoroalkanecarboxylate ion having 2 to 5 carbon atoms, an alkoxide ion having 1 to 4 carbon atoms, tetraphenylborate ion, tetrafluoroborate ion, hexafluorophosphate ion, perchlorate ion, fluoride ion, bromide ion, chloride ion, and iodide ion are preferable, and among them, the perfluoroalkanesulfonate ion having 1 to 4 carbon atoms, the bis(perfluoroalkanesulfonyl)imide ion represented by general formula (III), a tetrafluoroborate ion, bromide ion, chloride ion, iodide ion are preferable, and a perfluoroalkanesulfonate ion having 1 to 4 carbon atoms, bromide ion, chloride ion, iodide ion are particularly preferable.

Preferred specific example of magnesium salt represented by general formula (II) includes, for example, magnesium trifluoromethanesulfonate, magnesium nonafluorobutanesulfonate, magnesium bis(trifluoromethanesulfonyl)imide, magnesium bis(nonafluorobutanesulfonyl)imide, magnesium bis(fluorosulfonyl)imide, magnesium trifluoroacetate, magnesium pentafluoropropionate, magnesium ethoxide, magnesium tetraphenylborate, magnesium tetrafluoroborate, magnesium hexafluorophosphate, magnesium perchlorate, magnesium fluoride, magnesium bromide, magnesium chloride, magnesium iodide, or the like, and among them, magnesium trifluoromethanesulfonate, magnesium bis(trifluoromethanesulfonyl)imide, magnesium tetrafluoroborate, magnesium bromide, magnesium chloride, and magnesium iodide are preferable.

2. Compound Represented by General Formula (I)

n in general formula (I) is preferably 0 or 1.

When n is 0, the compound represented by general formula (I) represents $$A_1\text{-}A_2$$

(wherein $A_1$ and $A_2$ are the same as the above-described one).

An alkyl group having 1 to 6 carbon atoms in $R_1$ and $R_2$ may be any of a straight chained, branched, or cyclic one, and includes, for example, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a 3-methylpentyl group, a 2-methylpentyl group, a 1,2-dimethylbutyl group, a cyclopropyl group, a cyclopentyl group, a cyclohexyl group, or the like, and, a methyl group, an ethyl group, and an n-propyl group are preferable, and a methyl group is more preferable.

A halogenoalkyl group having 1 to 6 carbon atoms in $R_1$ and $R_2$ includes, for example, a fluoromethyl group, a fluoroethyl group, a fluoro-n-propyl group, a fluoro-n-butyl group, a fluoro-n-pentyl group, a fluoro-n-hexyl group, a chloromethyl group, a chloroethyl group, a chloro-n-propyl group, a chloro-n-butyl group, a chloro-n-pentyl group, a chloro-n-hexyl group, a bromomethyl group, a bromoethyl group, a bromo-n-propyl group, a bromo-n-butyl group, bromo-n-pentyl group, a bromo-n-hexyl group, an iodomethyl group, an iodoethyl group, an iodo-n-propyl group, an iodo-n-butyl group, an iodo-n-pentyl group, an iodo-n-hexyl group, a trifluoromethyl group, a pentafluoroethyl group, a heptafluoropropyl group, a nonafluorobutyl group, or the like.

Among the above-described specific examples, $R_1$ and $R_2$ are preferably a hydrogen atom, an alkyl group having 1 to 6 carbon atoms, or the like, more preferably a hydrogen atom, a methyl group, an ethyl group, an n-propyl group, or the like, and further preferably a hydrogen atom, and a methyl group.

An alkyl group having 1 to 6 carbon atoms in $R_3$ includes the same as the alkyl group having 1 to 6 carbon atoms in the above-described $R_1$ and $R_2$.

A halogenoalkyl group having 1 to 6 carbon atoms in $R_3$ includes the same as the halogenoalkyl group having 1 to 6 carbon atoms in the above-described $R_1$ and $R_2$.

An aryl group having 6 to 10 carbon atoms in $R_3$ includes a phenyl group, a naphthyl group, or the like.

An aralkyl group having 7 to 13 carbon atoms in $R_3$ includes a benzyl group, a phenylethyl group, a phenylpropyl group, a naphthylmethyl group, a naphthylethyl group, a naphthylpropyl group, or the like, and, a benzyl group is preferable.

Among the above-described specific examples, $R_3$ is preferably an alkyl group having 1 to 6 carbon atoms, a halogenoalkyl group having 1 to 6 carbon atoms, more preferably a methyl group, an ethyl group, an n-propyl group, a trifluoromethyl group, and further preferably a methyl group, and a trifluoromethyl group.

An alkyl group having 1 to 6 carbon atoms in $R_4$ includes the same as the alkyl group having 1 to 6 carbon atoms in the above-described $R_1$ and $R_2$.

A halogenoalkyl group having 1 to 6 carbon atoms in $R_4$ includes the same as the halogenoalkyl group having 1 to 6 carbon atoms in the above-described $R_1$ and $R_2$.

An aralkyl group having 7 to 13 carbon atoms in $R_4$ includes the same as the aralkyl group having 7 to 13 carbon atoms in the above-described $R_3$.

Among the above-described specific examples, $R_4$ is preferably an alkyl group having 1 to 6 carbon atoms, more preferably a methyl group, an ethyl group, and an n-propyl group, and further preferably a methyl group.

An alkyl group having 1 to 6 carbon atoms in $R_5$ includes the same as the alkyl group having 1 to 6 carbon atoms in the above-described $R_1$ and $R_2$.

A halogenoalkyl group having 1 to 6 carbon atoms in $R_5$ includes the same as the halogenoalkyl group having 1 to 6 carbon atoms in the above-described $R_1$ and $R_2$.

An alkoxyalkyl group having 3 to 8 carbon atoms in $R_5$ includes, for example, a methoxyethyl group, a methoxy-n-propyl group, a methoxyisopropyl group, an ethoxyethyl group, an ethoxy-n-propyl group, an ethoxyisopropyl group, an n-propoxyethyl group, an n-propoxy-n-propyl group, an n-propoxyisopropyl group, an isopropoxyethyl group, an isopropoxy-n-propyl group, an isopropoxyisopropyl group, an n-butoxyethyl group, an n-butoxy-n-propylgroup, an n-butoxyisopropyl group, or the like.

An aryl group having 6 to 10 carbon atoms in $R_5$ includes the same as the aryl group having 6 to 10 carbon atoms in the above-described $R_3$.

An aralkyl group having 7 to 13 carbon atoms in $R_5$ includes the same as the aralkyl group having 7 to 13 carbon atoms in the above-described $R_3$.

Among the above-described specific example, $R_5$ is preferably an alkyl group having 1 to 6 carbon atoms, or an alkoxyalkyl group having 3 to 8 carbon atoms, more preferably an alkyl group having 1 to 3 carbon atoms, and an alkoxyalkyl group having 3 to 8 carbon atoms. Specifically, a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, a neopentyl group, an n-hexyl group, an isohexyl group, a sec-hexyl group, a tert-hexyl group, a 3-methylpentyl group, a 2-methylpentyl group, a 1,2-dimethylbutyl group, a cyclopropyl group, a cyclopentyl group, a cyclohexyl group, a methoxyethyl group, a methoxy-n-propyl group, a methoxyisopropyl group, an ethoxyethyl group, an ethoxy-n-propyl group, an ethoxyisopropyl group, an n-propoxyethyl group, an n-propoxy-n-propyl group, an n-propoxyisopropyl group, an isopropoxyethyl group, an isopropoxy-n-propyl group, an isopropoxyisopropyl group, an n-butoxyethyl group, an n-butoxy-n-propyl group, n-butoxyisopropyl group are preferable, a methyl group, an ethyl group, an n-propyl group, an isopropyl group, a methoxyethyl group, a methoxy-n-propyl group, a methoxyisopropyl group, an ethoxyethyl group, an ethoxy-n-propyl group, an ethoxyisopropyl group, an n-propoxyethyl group, an n-propoxy-n-propyl group, an n-propoxyisopropyl group, an isopropoxyethyl group, an isopropoxy-n-propyl group, an isopropoxyisopropyl group, an n-butoxyethyl group, an n-butoxy-n-propyl group, and an n-butoxyisopropyl group are more preferable.

—C(=O)—$R_3$ in $A_1$ and $A_2$ includes, for example, a formyl group, a methylcarbonyl group, an ethylcarbonyl group, an n-propylcarbonyl group, an isopropylcarbonyl group, an n-butylcarbonyl group, an isobutylcarbonyl group, a sec-butylcarbonyl group, a tert-butylcarbonyl group, an n-pentylcarbonyl group, an isopentylcarbonyl group, a sec-pentylcarbonyl group, a tert-pentylcarbonyl group, a neopentylcarbonyl group, an n-hexylcarbonyl group, an isohexylcarbonyl group, a sec-hexylcarbonyl group, a tert-hexylcarbonyl group, a 3-methylpentylcarbonyl group, a 2-methylpentylcarbonyl group, a 1,2-dimethylbutylcarbonyl group, a cyclopropylcarbonyl group, a cyclopentylcarbonyl group, a cyclohexylcarbonyl group, a fluoromethylcarbonyl group, a fluoroethylcarbonyl group, a fluoro-n-propylcarbonyl group, a fluoro-n-butylcarbonyl group, a fluoro-n-pentylcarbonyl group, a fluoro-n-hexylcarbonyl group, a chloromethylcarbonyl group, a chloroethylcarbonyl group, a chloro-n-propylcarbonyl group, a chloro-n-butylcarbonyl group, a chloro-n-pentylcarbonyl group, a chloro-n-hexylcarbonyl group, a bromomethylcarbonyl group, a bromoethylcarbonyl group, a bromo-n-propylcarbonyl group, a bromo-n-butylcarbonylgroup, a bromo-n-pentylcarbonyl group, a bromo-n-hexylcarbonyl group, an iodomethylcarbonyl group, an iodoethylcarbonyl group, an iodo-n-propylcarbonyl group, an iodo-n2-butylcarbonyl group, an iodo-n-pentylcarbonyl group, an iodo-n-hexylcarbonyl group, a trifluoromethylcarbonyl group, a pentafluoroethylcarbonyl group, a heptafluoropropylcarbonyl group, a nonafluorobutylcarbonyl group, a phenylcarbonyl group, a naphthylcarbonyl group, a benzylcarbonyl group, a phenylethylcarbonyl group, a phenylpropylcarbonyl group, a naphthylmethylcarbonyl group, a naphthylethylcarbonyl group, naphthylpropylcarbonyl group, or the like, and among them, a methylcarbonyl group, an ethylcarbonyl group, an n-propylcarbonyl group, an isopropylcarbonyl group, an n-butylcarbonyl group, an isobutylcarbonyl group, a sec-butylcarbonyl group, a tert-butylcarbonyl group, an n-pentylcarbonyl group, an isopentylcarbonyl group, a sec-pentylcarbonyl group, a tert-pentylcarbonyl group, a neopentylcarbonyl group, an n-hexylcarbonyl group, an isohexylcarbonyl group, a sec-hexylcarbonyl group, a tert-hexylcarbonyl group, a 3-methylpentylcarbonyl group, a 2-methylpentylcarbonyl group, a 1,2-dimethylbutylcarbonyl group, a cyclopropylcarbonyl group, a cyclopentylcarbonyl group, a cyclohexylcarbonyl group, a trifluoromethylcarbonyl group, or the like, are preferable.

—O—$R_5$ in $A_1$ and $A_2$ includes a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a sec-pentyloxy group, a tert-pentyloxy group, a neopentyloxy group, an n-hexyloxy group, an isohexyloxy group, a sec-hexyloxy group, a tert-hexyloxy group, a 3-methylpentyloxy group, a 2-methylpentyloxy group, a 1,2-dimethylbutoxy group, a cyclopropyloxy group, a cyclopentyloxy group, a cyclohexyloxy group, a fluoromethyloxy group, a fluoroethyloxy group, a fluoro-n-propyloxy group, a fluoro-n-butyloxy group, a fluoro-n-pentyloxy group, a fluoro-n-hexyloxy group, a chloromethyloxy group, a chloroethyloxy group, a chloro-n-propyloxy group, a chloro-n-butyloxy group, a chloro-n-pentyloxy group, a chloro-n-hexyloxy group, a bromomethyloxy group, a bromoethyloxy group, a bromo-n-propyloxy group, a bromo-n-butyloxy group, a bromo-n-pentyloxy group, a bromo-n-hexyloxy group, an iodomethyloxy group, an iodoethyloxy group, an iodo-n-propyloxy group, an iodo-n-butyloxy group, an iodo-n-pentyloxy group, an iodo-n-hexyloxy group, a trifluoromethyloxy group, a pentafluoroethyloxy group, a methoxyethyloxy group, a methoxy-n-propyloxy group, a methoxyisopropyloxy group, an ethoxyethyloxy group, an ethoxy-n-propyloxy group, an ethoxyisopropyloxy group, an n-propoxyethyloxy group, an n-propoxy-n-propyloxy group, an n-propoxyisopropyloxy group, an isopropoxyethyloxy group, an isopropoxy-n-propyloxy group, an isopropoxyisopropyloxy group, an n-butoxyethyloxy group, an n-butoxy-n-propyloxy group, an n-butoxyisopropyloxy group, a phenyloxy group, a naphthyloxy group, a benzyloxy group, a phenylethyloxy group, a phenylpropyloxy group, a naphthylmethyloxy group, a naphthylethyloxy group, a naphthylpropyloxy group, or the like, and among them, a methoxy group, an ethoxy group, an n-propoxy group, an isopropoxy group, a methoxyethyloxy group, a methoxy-n-propyloxy group, a methoxyisopropyloxy group, an ethoxyethyloxy group, an ethoxy-n-propyloxy group, an ethoxyisopropyloxy group, an n-propoxyethyloxy group, an n-propoxy-n-propyloxy group, an n-propoxyisopropyloxy group, an isopropoxyethyloxy group, an isopropoxy-n-propyloxy group, an isopropoxyisopropyloxy group, an n-butoxyethyloxy group, an n-butoxy-n-propyloxy group, an n-butoxyisopropyloxy group, or the like, are preferable.

—N($R_4$)—$R_3$ in $A_1$ and $A_2$ includes an amino group, a methylamino group, an ethylamino group, an n-propylamino group, an n-butylamino group, a tert-butylamino group, an n-pentylamino group, n-hexylamino group, a cyclohexylamino group, a fluoromethylamino group, a fluoroethylamino group, a fluoro-n-propylamino group, a fluoro-n-butylamino group, a fluoro-n-pentylamino group, a fluoro-n-hexylamino group, a chloromethylamino group, a chloroethylamino group, a chloro-n-propylamino group, a chloro-n-butylamino group, a chloro-n-pentylamino group, a chloro-n-hexylamino group, a bromomethylamino group, a bromoethylamino group, a bromo-n-propylamino group, a bromo-n-butylamino group, a bromo-n-pentylamino group, a bromo-n-hexylamino group, an iodomethylamino group, an iodoethylamino group, an iodo-n-propylamino group, an iodo-n-butylamino group, an iodo-n-pentylamino group, an iodo-n-hexylamino group, a trifluoromethylamino group, a pentafluoroethylamino group, a phenylamino group, a naphthylamino group, a benzylamino group, a phenylethylamino group, a phenylpropylamino group, a naphthylmethylamino group; a dimethylamino group, a diethylamino group, a dipropylamino group, a dibutylamino group, a dipentylamino group, a dihexylamino group, an N-methyl-N'-ethylamino group, an N-methyl-N'-propylamino group, an N-methyl-N'-butylamino group, an N-methyl-N'-isobutylamino group, an N-methyl-N'-fluoromethylamino group, an N-ethyl-N'-fluoromethylamino group, an N-propyl-N'-fluoromethylamino group, an N-methyl-N'-fluoroethylamino group, an N-ethyl-N'-fluoroethylamino group, an N-propyl-N'-fluoropropylamino group, an N-methyl-N'-chloromethylamino group, an N-ethyl-N'-chloromethylamino group, an N-propyl-N'-chloromethylamino group, an N-methyl-N'-chloroethylamino group, an N-ethyl-N'-chloroethylamino group, an N-propyl-N'-chloropropylamino group, an N-methyl-N'-bromomethylamino group, an N-ethyl-N'-bromomethylamino group, an N-propyl-N'-bromomethylamino group, N-methyl-N'-bromoethylamino group, an N-ethyl-N'-bromoethylamino group, an N-propyl-N'-bromopropylamino group; an N-phenyl-N'-methylamino group, an N-phenyl-N'-ethylamino group, an N-phenyl-N'-propylamino group, an N-benzyl-N'-methylamino group, an N-benzyl-N'-ethylamino group, an N-benzyl-N'-propylamino group, an N-phenylethyl-N'-methylamino group, an N-phenylethyl-N'-ethylamino group, an N-phenylethyl-N'-propylamino group;

an N,N'-difluoromethylamino group, an N,N'-difluoroethylamino group, an N,N'-difluoropropylamino group, an N-fluoroethyl-N'-fluoromethylamino group, an N-fluoromethyl-N'-fluoropropylamino group, an N-fluoroethyl-N'-fluoropropylamino group, an N,N'-dichloromethylamino group, an N,N'-dichloroethylamino group, an N,N'-dichloropropylamino group, an N-chloroethyl-N'-chloromethylamino group, an N-chloromethyl-N'-chloropropylamino group, an N-chloroethyl-N'-chloropropylamino group, an N,N'-dibromomethylamino group, an N,N'-dibromoethylamino group, a dibromopropylamino group, an N-bromoethyl-N'-bromomethylamino group, an N-bromomethyl-N'-bromopropylamino group, an N-bromoethyl-N'-bromopropylamino group; an N-fluoromethyl-N'-phenylamino group, an N-fluoroethyl-N'-phenylamino group, an N-fluoro-n-propyl-N'-phenylamino group, an N-fluoro-n-butyl-N'-phenylamino group, an N-fluoro-n-pentyl-N'-phenylamino group, an N-fluoro-n-hexyl-N'-phenylamino group, an N-chloromethyl-N'-phenylamino group, an N-chloroethyl-N'-phenylamino group, an N-chloro-n-propyl-N'-phenylamino group, an N-chloro-n-butyl-N'-phenylamino group, an N-chloro-n-pentyl-N'-phenylamino group, an N-chloro-n-hexyl-N'-phenylamino group, an N-bromomethyl-N'-phenylamino group, an N-bromoethyl-N'-phenylamino group, an N-bromo-n-propyl-N'-phenylamino group, an N-bromo-n-butyl-N'-phenylamino group, an N-bromo-n-pentyl-N'-phenylamino group, an N-bromo-n-hexyl-N'-phenylamino group, an N-iodomethyl-N'-phenylamino group, an N-iodoethyl-N'-phenylamino group, an N-iodo-n-propyl-N'-phenylamino group, an N-iodo-n-butyl-N'-phenylamino group, an N-iodo-n-pentyl-N'-phenylamino group, an N-iodo-n-hexyl-N'-phenylamino group, an N-trifluoromethyl-N'-phenylamino group, an N-pentafluoroethyl-N'-phenylamino group; an N-fluoromethyl-N'-benzylamino group, an N-fluoroethyl-N'-benzylamino group, an N-fluoro-n-propyl-N'-benzylamino group, an N-fluoro-n-butyl-N'-benzylamino group, an N-fluoro-n-pentyl-N'-benzylamino group, an N-fluoro-n-hexyl-N'-benzylamino group, an N-chloromethyl-N'-benzylamino group, an N-chloroethyl-N'-benzylamino group, an N-chloro-n-propyl-N'-benzylamino group, an N-chloro-n-butyl-N'-benzylamino group, an N-chloro-n-pentyl-N'-benzylamino group, an N-chloro-n-hexyl-N'-benzylamino group, an N-bromomethyl-N'-benzylamino group, an N-bromoethyl-N'-benzylamino group, an N-bromo-n-propyl-N'-benzylamino group, an N-bromo-n-butyl-N'-benzylamino group, an N-bromo-n-pentyl-N'-benzylamino group, an N-bromo-n-hexyl-N'-benzylamino group, an N-iodomethyl-N'-benzylamino group, an N-iodoethyl-N'-benzylamino group, an N-iodo-n-propyl-N'-benzylamino group, an N-iodo-n-butyl-N'-benzylamino group, an N-iodo-n-pentyl-N'-benzylamino group, an N-iodo-n-hexyl-N'-benzylamino group, an N-trifluoromethyl-N'-benzylamino group, an N-pentafluoroethyl-N'-benzylamino group; an N-phenyl-N'-benzylamino group, an N-naphthyl-N'-benzylamino group, an N-benzyl-N'-benzylamino group, an N-phenylethyl-N'-benzylamino group, an N-phenylpropyl-N'-benzylamino group, an N-naphthylmethyl-N'-benzylamino group, or the like.

—S—$R_3$ in $A_1$ and $A_2$ includes a mercapto group, a methylthio group, an ethylthio group, an n-propylthio group, an n-butylthio group, a tert-butylthio group, an n-pentylthio group, an n-hexylthio group, a cyclohexylthio group; a fluoromethylthio group, a fluoroethylthio group, a fluoro-n-propylthio group, a fluoro-n-butylthio group, a fluoro-n-pentylthio group, a fluoro-n-hexylthio group, a chloromethylthio group, a chloroethylthio group, a chloro-n-propylthio group, a chloro-n-butylthio group, a chloro-n-pentylthio group, a chloro-n-hexylthio group, a bromomethylthio group, a bromoethylthio group, a bromo-n-propylthio group, a bromo-n-butylthio group, a bromo-n-pentylthio group, a bromo-n-hexylthio group, an iodomethylthio group, an iodoethylthio group, an iodo-n-propylthio group, an iodo-n-butylthio group, an iodo-n-pentylthio group, an iodo-n-hexylthio group, a trifluoromethylthio group, a pentafluoroethylthio group; a phenylthio group, a naphthylthio group, a benzylthio group, a phenylethylthio group, a phenylpropylthio group, a naphthylmethylthio group, or the like.

—C(=O)—$OR_3$ in $A_1$ and $A_2$ includes a carboxyl group, a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, a tert-butoxycarbonyl group, an n-pentyloxycarbonyl group, an isopentyloxycarbonyl group, a sec-pentyloxycarbonyl group, a tert-pentyloxycarbonyl group, a neopentyloxycarbonyl group, an n-hexyloxycarbonyl group, an isohexyloxycarbonyl group, a sec-hexyloxycarbonyl group, a tert-hexyloxycarbonyl group, a neohexyloxycarbonyl group, a cyclopropoxycarbonyl group, a cyclopentyloxycarbonyl group, a cyclohexyloxycarbonyl group; a fluoromethyloxycarbonyl group, a fluoroethyloxycarbonyl group, a fluoro-n-propyloxycarbonyl group, a fluoro-n-butyloxycarbonyl group, a fluoro-n-pentyloxycarbonyl group, a fluoro-n-hexyloxycarbonyl group, a chloromethyloxycarbonyl group, a chloroethyloxycarbonyl group, a chloro-n-propyloxycarbonyl group, a chloro-n-butyloxycarbonyl group, a chloro-n-pentyloxycarbonyl group, a chloro-n-hexyloxycarbonyl group, a bromomethyloxycarbonyl group, a bromoethyloxycarbonyl group, a bromo-n-propyloxycarbonyl group, a bromo-n-butyloxycarbonyl group, a bromo-n-pentyloxycarbonyl group, a bromo-n-hexyloxycarbonyl group, an iodomethyloxycarbonyl group, an iodoethyloxycarbonyl group, an iodo-n-propyloxycarbonyl group, an iodo-n-butyloxycarbonyl group, an iodo-n-pentyloxycarbonyl group, an iodo-n-hexyloxycarbonyl group, a trifluoromethyloxycarbonyl group, a pentafluoroethyloxycarbonyl group, a heptafluoropropyloxycarbonyl group, a nonafluorobutyloxycarbonyl group; a phenyloxycarbonyl group, a naphthyloxycarbonyl group, a benzyloxycarbonyl group, a phenylethyloxycarbonyl group, a phenylpropyloxycarbonyl group, a naphthylmethyloxycarbonyl group, or the like, among them, a carboxyl group, a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, a tert-butoxycarbonyl group, an n-pentyloxycarbonyl group, an isopentyloxycarbonyl group, a sec-pentyloxycarbonyl group, a tert-pentyloxycarbonyl group, a neopentyloxycarbonyl group, an n-hexyloxycarbonyl group, an isohexyloxycarbonyl group, a sec-hexyloxycarbonyl group, a tert-hexyloxycarbonyl group, a neohexyloxycarbonyl group, a cyclopropoxycarbonyl group, a cyclopentyloxycarbonyl group, a cyclohexyloxycarbonyl group are preferable.

—O—C(=O)—$R_3$ in $A_1$ and $A_2$ includes a formyloxy group, a methylcarbonyloxy group, an ethylcarbonyloxy group, an n-propylcarbonyloxy group, an n-butylcarbonyloxy group, a tert-butylcarbonyloxy group, an n-pentylcarbonyloxy group, an n-hexylcarbonyloxy group, a cyclohexylcarbonyloxy group; a fluoromethylcarbonyloxy group, a fluoroethylcarbonyloxy group, a fluoro-n-propylcarbonyloxy group, a fluoro-n-butylcarbonyloxy group, a fluoro-n-pentylcarbonyloxy group, a fluoro-n-hexylcarbonyloxy group, a chloromethylcarbonyloxy group, a chloroethylcarbonyloxy group, a chloro-n-propylcarbonyloxy group, a chloro-n-butylcarbonyloxy group, a chloro-n-pentylcarbonyloxy group, a chloro-n-hexylcarbonyloxy group, a bromomethylcarbonyloxy group, a bromoethylcarbonyloxy group, a bromo-n-propylcarbonyloxy group, a bromo-n- butylcarbonyloxy group, a bromo-n-pentylcarbonyloxy group, a bromo-n-hexylcarbonyloxy group, an iodomethylcarbonyloxy group, an iodoethylcarbonyloxy group, an iodo-n-propylcarbonyloxy group, an iodo-n-butylcarbonyloxy group, an iodo-n-pentylcarbonyloxy group, an iodo-n-hexylcarbonyloxy group, a trifluoromethylcarbonyloxy group, a pentafluoroethylcarbonyloxy group; a phenylcarbonyloxy group, a naphthylcarbonyloxy group, a benzylcarbonyloxy group, a phenylethylcarbonyloxy group, a phenylpropylcarbonyloxy group, a naphthylmethylcarbonyloxy group, or the like.

—C(=O)—N(R$_4$)—R$_3$ in A$_1$ and A$_2$ includes an aminocarbonyl group, a methylaminocarbonyl group, an ethylaminocarbonyl group, an n-propylaminocarbonyl group, an n-butylaminocarbonyl group, a tert-butylaminocarbonyl group, an n-pentylaminocarbonyl group, an n-hexylaminocarbonyl group, a cyclohexylaminocarbonyl group, a fluoromethylaminocarbonyl group, a fluoroethylaminocarbonyl group, a fluoro-n-propylaminocarbonyl group, a fluoro-n-butylaminocarbonyl group, a fluoro-n-pentylaminocarbonyl group, a fluoro-n-hexylaminocarbonyl group, a chloromethylaminocarbonyl group, a chloroethylaminocarbonyl group, a chloro-n-propylaminocarbonyl group, a chloro-n-butylaminocarbonyl group, a chloro-n-pentylaminocarbonyl group, a chloro-n-hexylaminocarbonyl group, a bromomethylaminocarbonyl group, a bromoethylaminocarbonyl group, a bromo-n-propylaminocarbonyl group, a bromo-n-butylaminocarbonyl group, a bromo-n-pentylaminocarbonyl group, a bromo-n-hexylaminocarbonyl group, an iodomethylaminocarbonyl group, an iodoethylaminocarbonyl group, an iodo-n-propylaminocarbonyl group, an iodo-n-butylaminocarbonyl group, an iodo-n-pentylaminocarbonyl group, an iodo-n-hexylaminocarbonyl group, a trifluoromethylaminocarbonyl group, a pentafluoroethylaminocarbonyl group, a phenylaminocarbonyl group, a naphthylaminocarbonyl group, a benzylaminocarbonyl group, a phenylethylaminocarbonyl group, a phenylpropylaminocarbonyl group, a naphthylmethylaminocarbonyl group; a dimethylaminocarbonyl group, a diethylaminocarbonyl group, a dipropylaminocarbonyl group, a dibutylaminocarbonyl group, a dipentylaminocarbonyl group, a dihexylaminocarbonyl group, an N-methyl-N'-ethylaminocarbonyl group, an N-methyl-N'-propylaminocarbonyl group, an N-methyl-N'-butylaminocarbonyl group, an N-methyl-N'-isobutylaminocarbonyl group, an N-methyl-N'-fluoromethylaminocarbonyl group, an N-ethyl-N'-fluoromethylaminocarbonyl group, an N-propyl-N'-fluoromethylaminocarbonyl group, an N-methyl-N'-fluoroethylaminocarbonyl group, an N-ethyl-N'-fluoroethylaminocarbonyl group, an N-propyl-N'-fluoropropylaminocarbonyl group, an N-methyl-N'-chloromethylaminocarbonyl group, an N-ethyl-N'-chloromethylaminocarbonyl group, an N-propyl-N'-chloromethylaminocarbonyl group, an N-methyl-N'-chloroethylaminocarbonyl group, an N-ethyl-N'-chloroethylaminocarbonyl group, an N-propyl-N'-chloropropylaminocarbonyl group, an N-methyl-N'-bromomethylaminocarbonyl group, an N-ethyl-N'-bromomethylaminocarbonyl group, an N-propyl-N'-bromomethylaminocarbonyl group, an N-methyl-N'-bromoethylaminocarbonyl group, an N-ethyl-N'-bromoethylaminocarbonyl group, an N-propyl-N'-bromopropylaminocarbonyl group;

an N-phenyl-N'-methylaminocarbonyl group, an N-phenyl-N'-ethylaminocarbonyl group, an N-phenyl-N'-propylaminocarbonyl group, an N-benzyl-N'-methylaminocarbonyl group, an N-benzyl-N'-ethylaminocarbonyl group, an N-benzyl-N'-propylaminocarbonyl group, an N-phenylethyl-N'-methylaminocarbonyl group, an N-phenylethyl-N'-ethylaminocarbonyl group, an N-phenylethyl-N'-propylaminocarbonyl group; an N,N'-difluoromethylaminocarbonyl group, an N,N'-difluoroethylaminocarbonyl group, an N,N'-difluoropropylaminocarbonyl group, an N-fluoroethyl-N'-fluoromethylaminocarbonyl group, an N-fluoromethyl-N'-fluoropropylaminocarbonyl group, an N-fluoroethyl-N'-fluoropropylaminocarbonyl group, a N,N'-dichloromethylaminocarbonyl group, a N,N'-dichloroethylaminocarbonyl group, a N,N'-dichloropropylaminocarbonyl group, an N-chloroethyl-N'-chloromethylaminocarbonyl group, an N-chloromethyl-N'-chloropropylaminocarbonyl group, an N-chloroethyl-N'-chloropropylaminocarbonyl group, an N,N'-dibromomethylaminocarbonyl group, an N,N'-dibromoethylaminocarbonyl group, a dibromopropylaminocarbonyl group, an N-bromoethyl-N'-bromomethylaminocarbonyl group, an N-bromomethyl-N'-bromopropylaminocarbonyl group, an N-bromoethyl-N'-bromopropylaminocarbonyl group; an N-fluoromethyl-N'-phenylcarbonylgroup, an N-fluoroethyl-N'-phenylcarbonyl group, an N-fluoro-n-propyl-N'-phenylcarbonyl group, an N-fluoro-n-butyl-N'-phenylcarbonyl group, an N-fluoro-n-pentyl-N'-phenylcarbonyl group, an N-fluoro-n-hexyl-N'-phenylcarbonyl group, an N-chloromethyl-N'-phenylcarbonyl group, an N-chloroethyl-N'-phenylcarbonyl group, an N-chloro-n-propyl-N'-phenylcarbonyl group, an N-chloro-n-butyl-N'-phenylcarbonyl group, an N-chloro-n-pentyl-N'-phenylcarbonyl group, an N-chloro-n-hexyl-N'-phenylcarbonyl group, an N-bromomethyl-N'-phenylcarbonyl group, an N-bromoethyl-N'-phenylcarbonyl group, an N-bromo-n-propyl-N'-phenylcarbonyl group, an N-bromo-n-butyl-N'-phenylcarbonyl group, an N-bromo-n-pentyl-N'-phenylcarbonyl group, an N-bromo-n-hexyl-N'-phenylcarbonyl group, an N-iodomethyl-N'-phenylcarbonyl group, an N-iodoethyl-N'-phenylcarbonyl group, an N-iodo-n-propyl-N'-phenylcarbonyl group, an N-iodo-n-butyl-N'-phenylcarbonyl group, an N-iodo-n-pentyl-N'-phenylcarbonyl group, an N-iodo-n-hexyl-N'-phenylcarbonyl group, an N-trifluoromethyl-N'-phenylcarbonyl group, an N-pentafluoroethyl-N'-phenylcarbonyl group;

an N-fluoromethyl-N'-benzylcarbonyl group, an N-fluoroethyl-N'-benzylcarbonyl group, an N-fluoro-n-propyl-N'-benzylcarbonyl group, an N-fluoro-n-butyl-N'-benzylcarbonyl group, an N-fluoro-n-pentyl-N'-benzylcarbonyl group, an N-fluoro-n-hexyl-N'-benzylcarbonyl group, an N-chloromethyl-N'-benzylcarbonyl group, an N-chloroethyl-N'-benzylcarbonyl group, an N-chloro-n-propyl-N'-benzylcarbonyl group, an N-chloro-n-butyl-N'-benzylcarbonyl group, an N-chloro-n-pentyl-N'-benzylcarbonyl group, an N-chloro-n-hexyl-N'-benzylcarbonyl group, an N-bromomethyl-N'-benzylcarbonyl group, an N-bromoethyl-N'-benzylcarbonyl group, an N-bromo-n-propyl-N'-benzylcarbonyl group, an N-bromo-n-butyl-N'-benzylcarbonyl group, an N-bromo-n-pentyl-N'-benzylcarbonyl group, an N-bromo-n-hexyl-N'-benzylcarbonyl group, an N-iodomethyl-N'-benzylcarbonyl group, an N-iodoethyl-N'-benzylcarbonyl group, an N-iodo-n-propyl-N'-benzylcarbonyl group, an N-iodo-n-butyl-N'-benzylcarbonyl group, an N-iodo-n-pentyl-N'-benzylcarbonyl group, an N-iodo-n-hexyl-N'-benzylcarbonyl group, an N-trifluoromethyl-N'-benzylcarbonyl group, an N-pentafluoroethyl-N'-benzylcarbonyl group; an N-phenyl-N'-benzylcarbonyl group, an N-naphthyl-N'-benzylcarbonyl group, an N-benzyl-N'-benzylcarbonyl group, an N-phenylethyl-N'-benzylcarbonyl group, an N-phenylpropyl-N'-benzylcarbonyl group, an N-naphthylmethyl-N'-benzylcarbonyl group, or the like.

—N($R_4$)—C(=O)—$R_3$ in $A_1$ and $A_2$ includes a formylamino group, a methylcarbonylamino group, an ethylcarbonylamino group, an n-propylcarbonylamino group, an n-butylcarbonylamino group, a tert-butylcarbonylamino group, an n-pentylcarbonylamino group, an n-hexylcarbonylamino group, an N-methylcarbonyl-N'-methylamino group, an N-ethylcarbonyl-N'-methylamino group, an N-n-propylcarbonyl-N'-methylamino group, an N-n-butylcarbonyl-N'-methylamino group, an N-tert-butylcarbonyl-N'-methylamino group, an N-n-pentylcarbonyl-N'-methylamino group, an N-n-hexylcarbonyl-N'-methylamino group, an N-methylcarbonyl-N'-ethylamino group, an N-ethylcarbonyl-N'-ethylamino group, an N-n-propylcarbonyl-N'-ethylamino group, an N-n-butylcarbonyl-N'-ethylamino group, an N-tert-butylcarbonyl-N'-ethylamino group, an N-n-pentylcarbonyl-N'-ethylamino group, an N-n-hexylcarbonyl-N'-ethylamino group; an N-methylcarbonyl-N'-fluoromethylamino group, an N-ethylcarbonyl-N'-fluoromethylamino group, an N-n-propylcarbonyl-N'-fluoromethylamino group, an N-n-butylcarbonyl-N'-fluoromethylamino group, an N-tert-butylcarbonyl-N'-fluoromethylamino group, an N-n-pentylcarbonyl-N'-fluoromethylamino group, an N-n-hexylcarbonyl-N'-fluoromethylamino group, an N-methylcarbonyl-N'-fluoroethylamino group, an N-ethylcarbonyl-N'-fluoroethylamino group, an N-n-propylcarbonyl-N'-fluoroethylamino group, an N-n-butylcarbonyl-N'-fluoroethylamino group, an N-tert-butylcarbonyl-N'-fluoroethylamino group, an N-n-pentylcarbonyl-N'-fluoroethylamino group, an N-n-hexylcarbonyl-N'-fluoroethylamino group; an N-methylcarbonyl-N'-phenylamino group, an N-ethylcarbonyl-N'-phenylamino group, an N-n-propylcarbonyl-N'-phenylamino group, an N-n-butylcarbonyl-N'-phenylamino group, an N-tert-butylcarbonyl-N'-phenylamino group, an N-n-pentylcarbonyl-N'-phenylamino group, an N-n-hexylcarbonyl-N'-phenylamino group; an N-methylcarbonyl-N'-benzylamino group, an N-ethylcarbonyl-N'-benzylamino group, an N-n-propylcarbonyl-N'-benzylamino group, an N-n-butylcarbonyl-N'-benzylamino group, an N-tert-butylcarbonyl-N'-benzylamino group, an N-n-pentylcarbonyl-N'-benzylamino group, an N-n-hexylcarbonyl-N'-benzylamino group, an N-methylcarbonyl-N'-phenylethylamino group, an N-ethylcarbonyl-N'-phenylethylamino group, an N-n-propylcarbonyl-N'-phenylethylamino group, an N-n-butylcarbonyl-N'-phenylethylamino group, an N-tert-butylcarbonyl-N'-phenylethylamino group, an N-n-pentylcarbonyl-N'-phenylethylamino group, an N-n-hexylcarbonyl-N'-phenylethylamino group;

a fluoromethylcarbonylamino group, a fluoroethylcarbonylamino group, a fluoro-n-propylcarbonylamino group, a fluoro-n-butylcarbonylamino group, a fluoro-n-pentylcarbonylamino group, a fluoro-n-hexylcarbonylamino group, a chloromethylcarbonylamino group, a chloroethylcarbonylamino group, a chloro-n-propylcarbonylamino group, a chloro-n-butylcarbonylamino group, a chloro-n-pentylcarbonylamino group, a chloro-n-hexylcarbonylamino group, a bromomethylcarbonylamino group, a bromoethylcarbonylamino group, a bromo-n-propylcarbonylamino group, an iodomethylcarbonylamino group, an iodoethylcarbonylamino group, an iodo-n-propylcarbonylamino group, a trifluoromethylcarbonylamino group, a pentafluoroethylcarbonylamino group; an N-methyl-N'-fluoromethylcarbonylamino group, an N-methyl-N'-fluoroethylcarbonylamino group, an N-methyl-N'-fluoro-n-propylcarbonylamino group, an N-methyl-N'-chloromethylcarbonylamino group, an N-methyl-N'-chloroethylcarbonylamino group, an N-methyl-N'-chloro-n-propylcarbonylamino group, an N-methyl-N'-bromomethylcarbonylamino group, an N-methyl-N'-bromoethylcarbonylamino group, an N-methyl-N'-bromo-n-propylcarbonylamino group, an N-methyl-N'-iodomethylcarbonylamino group, an N-methyl-N'-iodoethylcarbonylamino group, an N-methyl-N'-iodo-n-propylcarbonylamino group, an N-methyl-N'-trifluoromethylcarbonylamino group, an N-methyl-N'-pentafluoroethylcarbonylamino group; an N-ethyl-N'-fluoromethylcarbonylamino group, an N-ethyl-N'-fluoroethylcarbonylamino group, an N-ethyl-N'-fluoro-n-propylcarbonylamino group, an N-ethyl-N'-chloromethylcarbonylamino group, an N-ethyl-N'-chloroethylcarbonylamino group, an N-ethyl-N'-chloro-n-propylcarbonylamino group, an N-ethyl-N'-bromomethylcarbonylamino group, an N-ethyl-N'-bromoethylcarbonylamino group, an N-ethyl-N'-bromo-n-propylcarbonylamino group, an N-ethyl-N'-iodomethylcarbonylamino group, an N-ethyl-N'-iodoethylcarbonylamino group, an N-ethyl-N'-iodo-n-propylcarbonylamino group, an N-ethyl-N'-trifluoromethylcarbonylamino group, an N-ethyl-N'-pentafluoroethylcarbonylamino group; an N-fluoromethyl-N'-fluoromethylcarbonylamino group, an N-fluoromethyl-N'-fluoroethylcarbonylamino group, an N-fluoromethyl-N'-fluoro-n-propylcarbonylamino group, an N-fluoromethyl-N'-chloromethylcarbonylamino group, an N-fluoromethyl-N'-chloroethylcarbonylamino group, an N-fluoromethyl-N'-chloro-n-propylcarbonylamino group, an N-fluoromethyl-N'-bromomethylcarbonylamino group, an n-fluoromethyl-N'-bromoethylcarbonylamino group, an n-fluoromethyl-N'-bromo-n-propylcarbonylamino group, an N-fluoromethyl-N'-iodomethylcarbonylamino group, an N-fluoromethyl-N'-iodoethylcarbonylamino group, an N-fluoromethyl-N'-iodo-n-propylcarbonylamino group, an N-fluoromethyl-N'-trifluoromethylcarbonylamino group, an N-fluoromethyl-N'-pentafluoroethylcarbonylamino group;

an N-chloromethyl-N'-fluoromethylcarbonylamino group, an N-chloromethyl-N'-fluoroethylcarbonylamino group, an N-chloromethyl-N'-fluoro-n-propylcarbonylamino group, an N-chloromethyl-N'-chloromethylcarbonylamino group, an N-chloromethyl-N'-chloroethylcarbonylamino group, an N-chloromethyl-N'-chloro-n-propylcarbonylamino group, an N-chloromethyl-N'-bromomethylcarbonylamino group, an N-chloromethyl-N'-bromoethylcarbonylamino group, an N-chloromethyl-N'-bromo-n-propylcarbonylamino group, an N-chloromethyl-N'-iodomethylcarbonylamino group, an N-chloromethyl-N'-iodoethylcarbonylamino group, an N-chloromethyl-N'-iodo-n-propylcarbonylamino group, an N-chloromethyl-N'-trifluoromethylcarbonylamino group, an N-chloromethyl-N'-pentafluoroethylcarbonylamino group; an N-benzyl-N'-fluoromethylcarbonylamino group, an N-benzyl-N'-fluoroethylcarbonylamino group, an N-benzyl-N'-fluoro-n-propylcarbonylamino group, an N-benzyl-N'-chloromethylcarbonylamino group, an N-benzyl-N'-chloroethylcarbonylamino group, an N-benzyl-N'-chloro-n-propylcarbonylamino group, an N-benzyl-N'-bromomethylcarbonylamino group, an N-benzyl-N'-bromoethylcarbonylamino group, an N-benzyl-N'-bromo-n-propylcarbonylamino group, an N-benzyl-N'-iodomethylcarbonylamino group, an N-benzyl-N'-iodoethylcarbonylamino group, an N-benzyl-N'-iodo-n-propylcarbonylamino group, an N-benzyl-N'-trifluoromethylcarbonylamino group, an N-benzyl-N'-pentafluoroethylcarbonylamino group;

an N-methyl-N'-phenylcarbonylamino group, an N-methyl-N'-naphthylcarbonylamino group, an N-methyl-N'-benzylcarbonylamino group, an N-methyl-N'-phenylethylcarbonylamino group, an N-methyl-N'-phenylpropylcarbonylamino group, an N-methyl-N'-naphthylmethylcarbonylamino group, an N-ethyl-N'-phenylcarbonylamino group, an N-ethyl-N'-naphthylcarbonylamino group, an N-ethyl-N'-benzylcarbonylamino group, an N-ethyl-N'-phenylethylcarbonylamino group, an N-ethyl-N'-phenylpropylcarbonylamino group, an N-ethyl-N'-naphthylmethylcarbonylamino group, an N-propyl-N'-phenylcarbonylamino group, an N-propyl-N'-naphthylcarbonylamino group, an N-propyl-N'-benzylcarbonylamino group, an N-propyl-N'-phenylethylcarbonylamino group, an N-propyl-N'-phenylpropylcarbonylamino group, an N-propyl-N'-naphthylmethylcarbonylamino group, an N-fluoromethyl-N'-phenylcarbonylamino group, an N-fluoromethyl-N'-naphthylcarbonylamino group, an N-fluoromethyl-N'-benzylcarbonylamino group, an N-fluoromethyl-N'-phenylethylcarbonylamino group, an N-fluoromethyl-N'-phenylpropylcarbonylamino group, an N-fluoromethyl-N'-naphthylmethylcarbonylamino group, an N-fluoroethyl-N'-phenylcarbonylamino group, an N-fluoroethyl-N'-naphthylcarbonylamino group, an N-fluoroethyl-N'-benzylcarbonylamino group, an N-fluoroethyl-N'-phenylethylcarbonylamino group, an N-fluoroethyl-N'-phenylpropylcarbonylamino group, an N-fluoroethyl-N'-naphthylmethylcarbonylamino group, an N-propyl-N'-phenylcarbonylamino group, an N-propyl-N'-naphthylcarbonylamino group, an N-propyl-N'-benzylcarbonylamino group, an N-propyl-N'-phenylethylcarbonylamino group, an N-propyl-N'-phenylpropylcarbonylamino group, an N-propyl-N'-naphthylmethylcarbonylamino group, an N-chloromethyl-N'-phenylcarbonylamino group, an N-chloromethyl-N'-naphthylcarbonylamino group, an N-chloromethyl-N'-benzylcarbonylamino group, an N-chloromethyl-N'-phenylethylcarbonylamino group, an N-chloromethyl-N'-phenylpropylcarbonylamino group, an N-chloromethyl-N'-naphthylmethylcarbonylamino group, an N-chloroethyl-N'-phenylcarbonylamino group, an N-chloroethyl-N'-naphthylcarbonylamino group, an N-chloroethyl-N'-benzylcarbonylamino group, an N-chloroethyl-N'-phenylethylcarbonylamino group, an N-chloroethyl-N'-phenylpropylcarbonylamino group, an N-chloroethyl-N'-naphthylmethylcarbonylamino group; an N-benzyl-N'-phenylcarbonylamino group, an N-benzyl-N'-naphthylcarbonylamino group, an N-benzyl-N'-benzylcarbonylamino group, an N-benzyl-N'-phenylethylcarbonylamino group, an N-benzyl-N'-phenylpropylcarbonylamino group, an N-benzyl-N'-naphthylmethylcarbonylamino group, an N-benzyl-N'-phenylcarbonylamino group, an N-benzyl-N'-naphthylcarbonylamino group, an N-benzyl-N'-benzylcarbonylamino group, an N-benzyl-N'-phenylethylcarbonylamino group, an N-benzyl-N'-phenylpropylcarbonylamino group, an N-benzyl-N'-naphthylmethylcarbonylamino group, or the like.

—$SO_2$—$R_3$ in $A_1$ and $A_2$ includes, for example, a sulfino group, a methylsulfonyl group, an ethylsulfonyl group, an n-propylsulfonyl group, an n-butylsulfonyl group, a tert-butylsulfonyl group, an n-pentylsulfonyl group, an n-hexylsulfonyl group, a cyclohexylsulfonyl group; a fluoromethylsulfonyl group, a fluoroethylsulfonyl group, a fluoro-n-propylsulfonyl group, a fluoro-n-butylsulfonyl group, a fluoro-n-pentylsulfonyl group, a fluoro-n-hexylsulfonyl group, a chloromethylsulfonyl group, a chloroethylsulfonyl group, a chloro-n-propylsulfonyl group, a chloro-n-butylsulfonyl group, a chloro-n-pentylsulfonyl group, a chloro-n-hexylsulfonyl group, a bromomethylsulfonyl group, a bromoethylsulfonyl group, a bromo-n-propylsulfonyl group, a bromo-n-butylsulfonyl group, a bromo-n-pentylsulfonyl group, a bromo-n-hexylsulfonyl group, an iodomethylsulfonyl group, an iodoethylsulfonyl group, an iodo-n-propylsulfonyl group, an iodo-n-butylsulfonyl group, an iodo-n-pentylsulfonyl group, an iodo-n-hexylsulfonyl group, a trifluoromethylsulfonyl group, a pentafluoroethylsulfonyl group; a phenylsulfonylgroup, a naphthylsulfonyl group, a benzylsulfonyl group, a phenylethylsulfonyl group, a phenylpropylsulfonyl group, a naphthylmethylsulfonyl group, or the like.

—$N(R_4)$—$SO_2$—$R_3$ in $A_1$ and $A_2$ includes, for example, an N-sulfino-N'-methylamino group, an N-sulfino-N'-ethylamino group, an N-sulfino-N'-n-propylamino group, an N-sulfino-N'-n-butylamino group, an N-sulfino-N'-tert-butylamino group, an N-sulfino-N'-n-pentylamino group, an N-sulfino-N'-n-hexylamino group; an N-sulfino-N'-fluoromethylamino group, an N-sulfino-N'-fluoroethylamino group, an N-sulfino-N'-fluoro-n-propylamino group, an N-sulfino-N'-chloromethylamino group, an N-sulfino-N'-chloroethylamino group, an N-sulfino-N'-chloro-n-propylamino group, an N-sulfino-N'-bromomethylamino group, an N-sulfino-N'-bromoethylamino group, an N-sulfino-N'-bromo-n-propylamino group, an N-sulfino-N'-bromo-n-butylamino group, N-sulfino-N'-bromo-n-pentylamino group, an N-sulfino-N'-bromo-n-hexylamino group, an N-sulfino-N'-iodomethylamino group, an N-sulfino-N'-iodoethylamino group, an N-sulfino-N'-iodo-n-propylamino group, an N-sulfino-N'-trifluoromethylamino group, an N-sulfino-N'-pentafluoroethylamino group; an N-sulfino-N'-phenylamino group, an N-sulfino-N'-naphthylamino group, an N-sulfino-N'-benzylamino group, an N-sulfino-N'-phenylethylamino group, an N-sulfino-N'-phenylpropylamino group, an N-sulfino-N'-naphthylmethylamino group; an N-methylsulfonyl-N'-methylamino group, an N-methylsulfonyl-N'-ethylamino group, an N-methylsulfonyl-N'-n-propylamino group, an N-methylsulfonyl-N'-n-butylamino group, an N-methylsulfonyl-N'-tert-butylamino group, an N-methylsulfonyl-N'-n-pentylamino group, an N-methylsulfonyl-N'-n-hexylamino group; an N-methylsulfonyl-N'-fluoromethylamino group, an N-methylsulfonyl-N'-fluoroethylamino group, an N-methylsulfonyl-N'-fluoro-n-propylamino group, an N-methylsulfonyl-N'-chloromethylamino group, an N-methylsulfonyl-N'-chloroethylamino group, an N-methylsulfonyl-N'-chloro-n-propylamino group, an N-methylsulfonyl-N'-bromomethylamino group, an N-methylsulfonyl-N'-bromoethylamino group, an N-methylsulfonyl-N'-bromo-n-propylamino group, an N-methylsulfonyl-N'-bromo-n-butylamino group, an N-methylsulfonyl-N'-bromo-n-pentylamino group, an N-methylsulfonyl-N'-bromo-n-hexylamino group, an N-methylsulfonyl-N'-iodomethylamino group, an N-methylsulfonyl-N'-iodoethylamino group, an N-methylsulfonyl-N'-iodo-n-propylamino group, an N-methylsulfonyl-N'-trifluoromethylamino group, an N-methylsulfonyl-N'-pentafluoroethylamino group; an N-methylsulfonyl-N'-phenylamino group, an N-methylsulfonyl-N'-naphthylamino group, an N-methylsulfonyl-N'-benzylamino group, an N-methylsulfonyl-N'-phenylethylamino group, an N-methylsulfonyl-N'-phenylpropylamino group, an N-methylsulfonyl-N'-naphthylmethylamino group; an N-ethylsulfonyl-N'-methylamino group, an N-ethylsulfonyl-N'-ethylamino group, an N-ethylsulfonyl-N'-n-propylamino group, an N-ethylsulfonyl-N'-n-butylamino group, an N-ethylsulfonyl-N'-tert-butylamino group, an N-ethylsulfonyl-N'-n-pentylamino group, an N-ethylsulfonyl-N'-n-hexylamino group; an N-ethylsulfonyl-N'-fluoromethylamino group, an N-ethylsulfonyl-N'-fluoroethylamino group, an N-ethylsulfonyl-N'-fluoro-n-propylamino group, an N-ethylsulfonyl-N'-chloromethylamino group, an N-ethylsulfonyl-N'-chloroethylamino group, an N-ethylsulfonyl-N'-chloro-n-propylamino group, an N-ethylsulfonyl-N'-bromomethylamino group, an N-ethylsulfonyl-N'-bromoethylamino group, an N-ethylsulfonyl-N'-bromo-n-propylamino group, an N-ethylsulfonyl-N'-bromo-n-butylamino group, an N-ethylsulfonyl-N'-bromo-n-pentylamino group, an N-ethylsulfonyl-N'-bromo-n-hexylamino group, an N-ethylsulfonyl-N'-iodomethylamino group, an N-ethylsulfonyl-N'-iodoethylamino group, an N-ethylsulfonyl-N'-iodo-n-propylamino group, an N-ethylsulfonyl-N'-trifluoromethylamino group, an N-ethylsulfonyl-N'-pentafluoroethylamino group; an N-ethylsulfonyl-N'-phenylamino group, an N-ethylsulfonyl-N'-naphthylamino group, an N-ethylsulfonyl-N'-benzylamino group, an N-ethylsulfonyl-N'-phenylethylamino group, an N-ethylsulfonyl-N'-phenylpropylamino group, an N-ethylsulfonyl-N'-naphthylmethylamino group; an N-propylsulfonyl-N'-methylamino group, an N-propylsulfonyl-N'-ethylamino group, an N-propylsulfonyl-N'-n-propylamino group, an N-propylsulfonyl-N'-n-butylamino group, an N-propylsulfonyl-N'-tert-butylamino group, an N-propylsulfonyl-N'-n-pentylamino group, an N-propylsulfonyl-N'-n-hexylamino group; an N-propylsulfonyl-N'-fluoromethylamino group, an N-propylsulfonyl-N'-fluoroethylamino group, an N-propylsulfonyl-N'-fluoro-n-propylamino group, an N-propylsulfonyl-N'-chloromethylamino group, an N-propylsulfonyl-N'-chloroethylamino group, an N-propylsulfonyl-N'-chloro-n-propylamino group, an N-propylsulfonyl-N'-bromomethylamino group, an N-propylsulfonyl-N'-bromoethylamino group, an N-propylsulfonyl-N'-bromo-n-propylamino group, an N-propylsulfonyl-N'-bromo-n-butylamino group, an N-propylsulfonyl-N'-bromo-n-pentylamino group, an N-propylsulfonyl-N'-bromo-n-hexylamino group, an N-propylsulfonyl-N'-iodomethylamino group, an N-propylsulfonyl-N'-iodoethylamino group, an N-propylsulfonyl-N'-iodo-n-propylamino group, an N-propylsulfonyl-N'-trifluoromethylamino group, an N-propylsulfonyl-N'-pentafluoroethylamino group;
an N-propylsulfonyl-N'-phenylamino group, an N-propylsulfonyl-N'-naphthylamino group, an N-propylsulfonyl-N'-benzylamino group, an N-propylsulfonyl-N'-phenylethylamino group, an N-propylsulfonyl-N'-phenylpropylamino group, an N-propylsulfonyl-N'-naphthylmethylamino group; an N-fluoromethylsulfonyl-N'-methylamino group, an N-fluoromethylsulfonyl-N'-ethylamino group, an N-fluoromethylsulfonyl-N'-n-propylamino group, an N-fluoromethylsulfonyl-N'-n-butylamino group, an N-fluoromethylsulfonyl-N'-tert-butylamino group, an N-fluoromethylsulfonyl-N'-n-pentylamino group, an N-fluoromethylsulfonyl-N'-n-hexylamino group; an N-fluoromethylsulfonyl-N'-fluoromethylamino group, an N-fluoromethylsulfonyl-N'-fluoroethylamino group, an N-fluoromethylsulfonyl-N'-fluoro-n-propylamino group, an N-fluoromethylsulfonyl-N'-chloromethylamino group, an N-fluoromethylsulfonyl-N'-chloroethylamino group, an N-fluoromethylsulfonyl-N'-chloro-n-propylamino group, an N-fluoromethylsulfonyl-N'-bromomethylamino group, an N-fluoromethylsulfonyl-N'-bromoethylamino group, an N-fluoromethylsulfonyl-N'-bromo-n-propylamino group, an N-fluoromethylsulfonyl-N'-bromo-n-butylamino group, an N-fluoromethylsulfonyl-N'-bromo-n-pentylamino group, an N-fluoromethylsulfonyl-N'-bromo-n-hexylamino group, an N-fluoromethylsulfonyl-N'-iodomethylamino group, an N-fluoromethylsulfonyl-N'-iodoethylamino group, an N-fluoromethylsulfonyl-N'-iodo-n-propylamino group, an N-fluoromethylsulfonyl-N'-trifluoromethylamino group, an N-fluoromethylsulfonyl-N'-pentafluoroethylamino group; an N-fluoromethylsulfonyl-N'-phenylamino group, an N-fluoromethylsulfonyl-N'-naphthylamino group, an N-fluoromethylsulfonyl-N'-benzylamino group, an N-fluoromethylsulfonyl-N'-phenylethylamino group, an N-fluoromethylsulfonyl-N'-phenylpropylamino group, an N-fluoromethylsulfonyl-N'-naphthylmethylamino group; an N-fluoroethylsulfonyl-N'-methylamino group, an N-fluoroethylsulfonyl-N'-ethylamino group, an N-fluoroethylsulfonyl-N'-n-propylamino group, an N-fluoroethylsulfonyl-N'-n-butylamino group, an N-fluoroethylsulfonyl-N'-tert-butylamino group, an N-fluoroethylsulfonyl-N'-n-pentylamino group, an N-fluoroethylsulfonyl-N'-n-hexylamino group;
an N-fluoroethylsulfonyl-N'-fluoromethylamino group, an N-fluoroethylsulfonyl-N'-fluoroethylamino group, an N-fluoroethylsulfonyl-N'-fluoro-n-propylamino group, an N-fluoroethylsulfonyl-N'-chloromethylamino group, an N-fluoroethylsulfonyl-N'-chloroethylamino group, an N-fluoroethylsulfonyl-N'-chloro-n-propylamino group, an N-fluoroethylsulfonyl-N'-bromomethylamino group, an N-fluoroethylsulfonyl-N'-bromoethylamino group, an N-fluoroethylsulfonyl-N'-bromo-n-propylamino group, an N-fluoroethylsulfonyl-N'-bromo-n-butylamino group, an N-fluoroethylsulfonyl-N'-bromo-n-pentylamino group, an N-fluoroethylsulfonyl-N'-bromo-n-hexylamino group, an N-fluoroethylsulfonyl-N'-iodomethylamino group, an N-fluoroethylsulfonyl-N'-iodoethylamino group, an N-fluoroethylsulfonyl-N'-iodo-n-propylamino group, an N-fluoroethylsulfonyl-N'-trifluoromethylamino group, N-fluoroethylsulfonyl-N'-pentafluoroethylamino group; an N-fluoroethylsulfonyl-N'-phenylamino group, an N-fluoroethylsulfonyl-N'-naphthylamino group, an N-fluoroethylsulfonyl-N'-benzylamino group, an N-fluoroethylsulfonyl-N'-phenylethylamino group, an N-fluoroethylsulfonyl-N'-phenylpropylamino group, an N-fluoroethylsulfonyl-N'-naphthylmethylamino group; an N-fluoro-n-propylsulfonyl-N'-methylamino group, an N-fluoro-n-propylsulfonyl-N'-ethylamino group, an N-fluoro-n-propylsulfonyl-N'-n-propylamino group, an N-fluoro-n-propylsulfonyl-N'-n-butylamino group, an N-fluoro-n-propylsulfonyl-N'-tert-butylamino group, an N-fluoro-n-propylsulfonyl-N'-n-pentylamino group, an N-fluoro-n-propylsulfonyl-N'-n-hexylamino group; an N-fluoro-n-propylsulfonyl-N'-fluoromethylamino group, an N-fluoro-n-propylsulfonyl-N'-fluoroethylamino group, an N-fluoro-n-propylsulfonyl-N'-fluoro-n-propylamino group, an N-fluoro-n-propylsulfonyl-N'-chloromethylamino group, an N-fluoro-n-propylsulfonyl-N'-chloroethylamino group, an N-fluoro-n-propylsulfonyl-N'-chloro-n-propylamino group, an N-fluoro-n-propylsulfonyl-N'-bromomethylamino group, an N-fluoro-n-propylsulfonyl-N'-bromoethylamino group, an N-fluoro-n-propylsulfonyl-N'-bromo-n-propylamino group, an N-fluoro-n-propylsulfonyl-N'-bromo-n-butylamino group, an N-fluoro-n-propylsulfonyl-N'-bromo-n-pentylamino group, an N-fluoro-n-propylsulfonyl-N'-bromo-n-hexylamino group, an N-fluoro-n-propylsulfonyl-N'-iodomethylamino group, an N-fluoro-n-propylsulfonyl-N'-iodoethylamino group, an N-fluoro-n-propylsulfonyl-N'-iodo-n-propylamino group, an N-fluoro-n-propylsulfonyl- N'-trifluoromethylamino group, an N-fluoro-n-propylsulfonyl-N'-pentafluoroethylamino group; an N-fluoro-n-propylsulfonyl-N'-phenylamino group, an N-fluoro-n-propylsulfonyl-N'-naphthylamino group, an N-fluoro-n-propylsulfonyl-N'-benzylamino group, an N-fluoro-n-propylsulfonyl-N'-phenylethylamino group, an N-fluoro-n-propylsulfonyl-N'-phenylpropylamino group, an N-fluoro-n-propylsulfonyl-N'-naphthylmethylamino group; an N-chloromethylsulfonyl-N'-methylamino group, an N-chloromethylsulfonyl-N'-ethylamino group, an N-chloromethylsulfonyl-N'-n-propylamino group, an N-chloromethylsulfonyl-N'-n-butylamino group, an N-chloromethylsulfonyl-N'-tert-butylamino group, an N-chloromethylsulfonyl-N'-n-pentylamino group, an N-chloromethylsulfonyl-N'-n-hexylamino group; an N-chloromethylsulfonyl-N'-fluoromethylamino group, an N-chloromethylsulfonyl-N'-fluoroethylamino group, an N-chloromethylsulfonyl-N'-fluoro-n-propylamino group, an N-chloromethylsulfonyl-N'-chloromethylamino group, an N-chloromethylsulfonyl-N'-chloroethylamino group, an N-chloromethylsulfonyl-N'-chloro-n-propylamino group, an N-chloromethylsulfonyl-N'-bromomethylamino group, an N-chloromethylsulfonyl-N'-bromoethylamino group, an N-chloromethylsulfonyl-N'-bromo-n-propylamino group, an N-chloromethylsulfonyl-N'-bromo-n-butylamino group, an N-chloromethylsulfonyl-N'-bromo-n-pentylamino group, an N-chloromethylsulfonyl-N'-bromo-n-hexylamino group, an N-chloromethylsulfonyl-N'-iodomethylamino group, an N-chloromethylsulfonyl-N'-iodoethylamino group, an N-chloromethylsulfonyl-N'-iodo-n-propylamino group, an N-chloromethylsulfonyl-N'-trifluoromethylamino group, an N-chloromethylsulfonyl-N'-pentafluoroethylamino group, an N-chloromethylsulfonyl-N'-phenylamino group, an N-chloromethylsulfonyl-N'-naphthylamino group, an N-chloromethylsulfonyl-N'-benzylamino group, an N-chloromethylsulfonyl-N'-phenylethylamino group, an N-chloromethylsulfonyl-N'-phenylpropylamino group, an N-chloromethylsulfonyl-N'-naphthylmethylamino group; an N-chloroethylsulfonyl-N'-methylamino group, an N-chloroethylsulfonyl-N'-ethylamino group, an N-chloroethylsulfonyl-N'-n-propylamino group, an N-chloroethylsulfonyl-N'-n-butylamino group, an N-chloroethylsulfonyl-N'-tert-butylamino group, an N-chloroethylsulfonyl-N'-n-pentylamino group, an N-chloroethylsulfonyl-N'-n-hexylamino group;

an N-chloroethylsulfonyl-N'-fluoromethylamino group, an N-chloroethylsulfonyl-N'-fluoroethylamino group, an N-chloroethylsulfonyl-N'-fluoro-n-propylamino group, an N-chloroethylsulfonyl-N'-chloromethylamino group, an N-chloroethylsulfonyl-N'-chloroethylamino group, an N-chloroethylsulfonyl-N'-chloro-n-propylamino group, an N-chloroethylsulfonyl-N'-bromomethylamino group, an N-chloroethylsulfonyl-N'-bromoethylamino group, an N-chloroethylsulfonyl-N'-bromo-n-propylamino group, an N-chloroethylsulfonyl-N'-bromo-n-butylamino group, an N-chloroethylsulfonyl-N'-bromo-n-pentylamino group, an N-chloroethylsulfonyl-N'-bromo-n-hexylamino group, an N-chloroethylsulfonyl-N'-iodomethylamino group, an N-chloroethylsulfonyl-N'-iodoethylamino group, an N-chloroethylsulfonyl-N'-iodo-n-propylamino group, an N-chloroethylsulfonyl-N'-trifluoromethylamino group, an N-chloroethylsulfonyl-N'-pentafluoroethylamino group; an N-chloroethylsulfonyl-N'-phenylamino group, an N-chloroethylsulfonyl-N'-naphthylamino group, an N-chloroethylsulfonyl-N'-benzylamino group, an N-chloroethylsulfonyl-N'-phenylethylamino group, an N-chloroethylsulfonyl-N'-phenylpropylamino group, an N-chloroethylsulfonyl-N'-naphthylmethylamino group; an N-phenylsulfonyl-N'-methylamino group, an N-phenylsulfonyl-N'-ethylamino group, an N-phenylsulfonyl-N'-n-propylamino group, an N-phenylsulfonyl-N'-n-butylamino group, an N-phenylsulfonyl-N'-tert-butylamino group, an N-phenylsulfonyl-N'-n-pentylamino group, an N-phenylsulfonyl-N'-n-hexylamino group; an N-phenylsulfonyl-N'-fluoromethyl amino group, an N-phenylsulfonyl-N'-fluoroethylamino group, an N-phenylsulfonyl-N'-fluoro-n-propylamino group, an N-phenylsulfonyl-N'-chloromethylamino group, an N-phenylsulfonyl-N'-chloroethylamino group, an N-phenylsulfonyl-N'-chloro-n-propylamino group, an N-phenylsulfonyl-N'-bromomethylamino group, an N-phenylsulfonyl-N'-bromoethylamino group, an N-phenylsulfonyl-N'-bromo-n-propylamino group, an N-phenylsulfonyl-N'-bromo-n-butylamino group, an N-phenylsulfonyl-N'-bromo-n-pentylamino group, an N-phenylsulfonyl-N'-bromo-n-hexylamino group, an N-phenylsulfonyl-N'-iodomethylamino group, an N-phenylsulfonyl-N'-iodoethylamino group, an N-phenylsulfonyl-N'-iodo-n-propylamino group, an N-phenylsulfonyl-N'-trifluoromethylamino group, an N-phenylsulfonyl-N'-pentafluoroethylamino group; an N-phenylsulfonyl-N'-phenylamino group, an N-phenylsulfonyl-N'-naphthylamino group, an N-phenylsulfonyl-N'-benzylamino group, an N-phenylsulfonyl-N'-phenylethylamino group, an N-phenylsulfonyl-N'-phenylpropylamino group, an N-phenylsulfonyl-N'-naphthylmethylamino group; an N-benzylsulfonyl-N'-methylamino group, an N-benzylsulfonyl-N'-ethylamino group, an N-benzylsulfonyl-N'-n-propylamino group, an N-benzylsulfonyl-N'-n-butylamino group, an N-benzylsulfonyl-N'-tert-butylamino group, an N-benzylsulfonyl-N'-n-pentylamino group, an N-benzylsulfonyl-N'-n-hexylamino group;

an N-benzylsulfonyl-N'-fluoromethylamino group, an N-benzylsulfonyl-N'-fluoroethylamino group, an N-benzylsulfonyl-N'-fluoro-n-propylamino group, an N-benzylsulfonyl-N'-chloromethylamino group, an N-benzylsulfonyl-N'-chloroethylamino group, an N-benzylsulfonyl-N'-chloro-n-propylamino group, an N-benzylsulfonyl-N'-bromomethylamino group, an N-benzylsulfonyl-N'-bromoethylamino group, an N-benzylsulfonyl-N'-bromo-n-propylamino group, an N-benzylsulfonyl-N'-bromo-n-butylamino group, an N-benzylsulfonyl-N'-bromo-n-pentylamino group, an N-benzylsulfonyl-N'-bromo-n-hexylamino group, an N-benzylsulfonyl-N'-iodomethylamino group, an N-benzylsulfonyl-N'-iodoethylamino group, an N-benzylsulfonyl-N'-iodo-n-propylamino group, an N-benzylsulfonyl-N'-trifluoromethylamino group, an N-benzylsulfonyl-N'-pentafluoroethylamino group; an N-benzylsulfonyl-N'-phenylamino group, an N-benzylsulfonyl-N'-naphthylamino group, an N-benzylsulfonyl-N'-benzylamino group, an N-benzylsulfonyl-N'-phenylethylamino group, an N-benzylsulfonyl-N'-phenylpropylamino group, an N-benzylsulfonyl-N'-naphthylmethylamino group, or the like.

—O—B(OR$_5$)$_2$ in A$_1$ and A$_2$ includes, for example, a dimethoxyboryloxy group, a diethoxyboryloxy group, a di-n-propoxyboryloxy group, a di-n-butoxyboryloxy group, a di-tert-butoxyboryloxy group, a di-n-pentyloxyboryloxy group, a di-n-hexyloxyboryloxy group; a di(fluoromethyloxy)boryloxy group, a di(fluoroethyloxy)boryloxy group, a di(fluoro-n-propyloxy)boryloxy group, a di(fluoro-n-butyloxy)boryloxy group, a di(fluoro-n-pentyloxy)boryloxy group, a di(fluoro-n-hexyloxy)boryloxy group, a di(chloromethyloxy)boryloxy group, a di(chloroethyloxy)boryloxy group, a di(chloro-n-propyloxy)boryloxy group, a di(chloron-butyloxy)boryloxy group, a di(chloro-n-pentyloxy)boryloxy group, a di(chloro-n-hexyloxy)boryloxy group, a di(bromomethyloxy)boryloxy group, a di(bromoethyloxy)boryloxy group, a di(bromo-n-propyloxy)boryloxy group, a di(bromo-n-butyloxy)boryloxy group, a di(bromo-n-pentyloxy)boryloxy group, a di(bromo-n-hexyloxy)boryloxy group, a di(iodomethyloxy)boryloxy group, a di(iodoethyloxy)boryloxy group, a di(iodo-n-propyloxy)boryloxy group, a di(iodo-n-butyloxy)boryloxy group, a di(iodo-n-pentyloxy)boryloxy group, a di(iodo-n-hexyloxy)boryloxy group, a di(trifluoromethyloxy)boryloxy group, a di(pentafluoroethyloxy)boryloxy group; a di(methoxyethyloxy)boryloxy group, a di(methoxy-n-propyloxy)boryloxy group, a di(methoxyisopropyloxy)boryloxy group, a di(ethoxyethyloxy)boryloxy group, a di(ethoxy-n-propyloxy)boryloxy group, a di(ethoxyisopropyloxy)boryloxy group, a di(n-propoxyethyloxy)boryloxy group, a di(n-propoxy-n-propyloxy)boryloxy group, a di(n-propoxyisopropyloxy)boryloxy group, a di(isopropoxyethyloxy)boryloxy group, a di(isopropoxy-n-propyloxy)boryloxy group, a di(isopropoxyisopropyloxy)boryloxy group, a di(n-butoxyethyloxy)boryloxy group, a di(n-butoxy-n-propyloxy)boryloxy group, a di(n-butoxyisopropyloxy)boryloxy group, a di(phenyloxy)boryloxy group, a di(naphthyloxy)boryloxy group, a di(benzyloxy)boryloxy group, a di(phenylethyloxy)boryloxy group, a di(phenylpropyloxy)boryloxy group, a di(naphthylmethyloxy)boryloxy group, or the like.

—O—P(=O)(OR$_5$)$_2$ in A$_1$ and A$_2$ includes, for example, a dimethylphosphonooxy group, a diethylphosphonooxy group, a dipropylphosphonooxy group, a dibutylphosphonooxy group, a di-tert-butylphosphonooxy group, a dipentylphosphonooxy group, a dihexylphosphonooxy group; a di(fluoromethyl)phosphonooxy group, a di(fluoroethyl)phosphonooxy group, a di(fluoro-n-propyl)phosphonooxy group, a di(fluoro-n-butyl)phosphonooxy group, a di(fluoro-n-pentyl)phosphonooxy group, a di(fluoro-n-hexyl)phosphonooxy group, a di(chloromethyl)phosphonooxy group, a di(chloroethyl)phosphonooxy group, a di(chloro-n-propyl)phosphonooxy group, a di(chloro-n-butyl)phosphonooxy group, a di(chloro-n-pentyl)phosphonooxy group, a di(chloro-n-hexyl)phosphonooxy group, a di(bromomethyl)phosphonooxy group, a di(bromoethyl)phosphonooxy group, a di(bromo-n-propyl)phosphonooxy group, a di(bromo-n-butyl)phosphonooxy group, a di(bromo-n-pentyl)phosphonooxy group, a di(bromo-n-hexyl)phosphonooxy group, a di(iodomethyl)phosphonooxy group, a di(iodoethyl)phosphonooxy group, a di(iodo-n-propyl)phosphonooxy group, a di(iodo-n-butyl)phosphonooxy group, a di(iodo-n-pentyl)phosphonooxy group, a di(iodo-n-hexyl)phosphonooxy group, a di(trifluoromethyl)phosphonooxy group, a di(pentafluoroethyl)phosphonooxy group; a di(methoxy-n-propyl)phosphonooxy group, a di(methoxyisopropyl)phosphonooxy group, a di(ethoxyethyl)phosphonooxy group, a di(ethoxy-n-propyl)phosphonooxy group, a di(ethoxyisopropyl)phosphonooxy group, a di(n-propoxyethyl)phosphonooxy group, a di(n-propoxy-n-propyl)phosphonooxy group, a di(n-propoxyisopropyl)phosphonooxy group, a di(isopropoxyethyl)phosphonooxy group, a di(isopropoxy-n-propyl)phosphonooxy group, a di(isopropoxyisopropyl)phosphonooxy group, a di(n-butoxyethyl)phosphonooxy group, a di(n-butoxy-n-propyl)phosphonooxy group, a di(n-butoxyisopropyl)phosphonooxy group, a diphenylphosphonooxy group, a dinaphthylphosphonooxy group, a dibenzylphosphonooxy group, a di(phenylethyl)phosphonooxy group, a di(phenylpropyl)phosphonooxy group, a di(naphthylmethyl)phosphonooxy group, or the like.

Among them, a dimethylphosphonooxy group, a diethylphosphonooxy group, a di-n-propylphosphonooxy group, a diisopropylphosphonooxy group, di-n-butylphosphonooxy group, a diisobutylphosphonooxy group, a di-sec-butylphosphonooxy group, a di-tert-butylphosphonooxy group, a di-n-pentylphosphonooxy group, a diisopentylphosphonooxy group, a di-sec-pentylphosphonooxy group, a di-tert-pentylphosphonooxy group, a dineopentylphosphonooxy group, a di-n-hexylphosphonooxy group, a diisohexylphosphonooxy group, a di-sec-hexylphosphonooxy group, a di-tert-hexylphosphonooxy group, a di(3-methylpentyl)phosphonooxy group, a di(2-methylpentyl)phosphonooxy group, a di(1,2-dimethylbutyl)phosphonooxy group, a di(cyclopropyl)phosphonooxy group, a di(cyclopentyl)phosphonooxy group, a di(cyclohexyl)phosphonooxy group, a di(methoxyethyl)phosphonooxy group, a di(methoxy-n-propyl)phosphonooxy group, a di(methoxyisopropyl)phosphonooxy group, a di(ethoxyethyl)phosphonooxy group, a di(ethoxy-n-propyl)phosphonooxy group, a di(ethoxyisopropyl)phosphonooxy group, a di(n-propoxyethyl)phosphonooxy group, a di(n-propoxy-n-propyl)phosphonooxy group, a di(n-propoxyisopropyl)phosphonooxy group, a di(isopropoxyethyl)phosphonooxy group, a di(isopropoxy-n-propyl)phosphonooxy group, a di(isopropoxyisopropyl)phosphonooxy group, a di(n-butoxyethyl)phosphonooxy group, a di(n-butoxy-n-propyl)phosphonooxy group, a di(n-butoxyisopropyl)phosphonooxy group, or the like are preferable, and, a di(methoxyethyl)phosphonooxy group, a di(methoxy-n-propyl)phosphonooxy group, a di(methoxyisopropyl)phosphonooxy group, a di(ethoxyethyl)phosphonooxy group, a di(ethoxy-n-propyl)phosphonooxy group, a di(ethoxyisopropyl)phosphonooxy group, a di(n-propoxyethyl)phosphonooxy group, a di(n-propoxy-n-propyl)phosphonooxy group, a di(n-propoxyisopropyl)phosphonooxy group, a di(isopropoxyethyl)phosphonooxy group, a di(isopropoxy-n-propyl)phosphonooxy group, a di(isopropoxyisopropyl)phosphonooxy group, a di(n-butoxyethyl)phosphonooxy group, a di(n-butoxy-n-propyl)phosphonooxy group, a di(n-butoxyisopropyl)phosphonooxy group, or the like, are more preferable.

A monocyclic heterocyclic group in A$_1$ and A$_2$ is preferably a 5 membered ring or a 6 membered ring, and specifically includes a group derived from a saturated heterocyclic ring, such as pyrrolidine, imidazolidine, pyrazolidine, piperazine, piperidine, morpholine, tetrahydrofuran, tetrahydropyran, tetrahydrothiophene, tetrahydrothiopyran, sulfolane, and pentamethylenesulfone; and a group derived from an unsaturated heterocyclic ring, for example, pyrrole, pyrroline, imidazole, imidazoline, pyrazole, pyrazoline, pyrimidine, pyrazine, triazole, oxazole, thiazole, isothiazole, furan, pyran, thiophene, or the like.

A group derived from cyclic acetal in A$_1$ and A$_2$ includes, for example, the one having 3 to 6 carbon atoms, and specifically includes, for example, a dioxolanyl group, a dioxanyl group, or the like, and, a dioxolanyl group is preferable.

A group derived from a cyclic carbonate ester in A$_1$ and A$_2$ includes a group derived from vinylene carbonate, a group derived from ethylene carbonate (1,3-dioxolane-2-one), a group derived from propylene carbonate, or the like, and, the group derived from ethylene carbonate is preferable.

A group derived from a cyclic carboxylate ester in A$_1$ and A$_2$ includes, for example, a group derived from a lactone compound having 3 to 9 carbon atoms, and specifically includes, for example, a group derived from γ-butyrolactone, γ-valerolactone, γ-caprolactone, and ε-caprolactone.

As for $A_1$ and $A_2$, they may form a cyclic structure when n is 0, and they may form a cyclic structure with carbons located between them when n is 1 to 6. Said cyclic structure includes, for example, a cycloalkane ring having 4 to 7 carbon atoms, and a 5 to 7 membered heterocyclic ring containing oxygen atom, nitrogen atom, sulfur atom, or the like, in the ring, and they may have an oxo group as a substituent. Specific example of said cycloalkane ring includes a cyclobutyl ring, a cyclopentyl ring, a cyclohexyl ring, a cycloheptyl ring, or the like, and specific example of said heterocyclic ring includes a pyrrolidine ring, a piperidine ring, a hexamethylene imine ring, an oxolane ring, an oxane ring, a hexamethylene oxide ring, a thiolane ring, a thiane ring, a hexamethylene sulfide ring, or the like. Preferred specific example of the above-described cyclic structure includes 1,2-cyclopentanedione, 1,3-cyclopentanedione, 1,2-cyclohexanedione, 1,3-cyclohexanedione, 1,4-cyclohexanedione, or the like.

As for $A_1$ and $R_1$, a cyclic structure may be formed by $A_1$, carbon binding to $A_1$ and $R_1$, and $R_1$ binding to carbon thereof, when n is 1 to 6. Said cyclic structure includes, for example, a cycloalkane ring having 4 to 7 carbon atoms, a 5 to 7 membered heterocyclic ring containing oxygen atom, nitrogen atom, sulfur atom, or the like, in the ring, or the like, and they may have an oxo group as a substituent. Specific example of said cycloalkane ring and heterocyclic ring includes the same one as these in the above-described cyclic structure formed by $A_1$ and $A_2$. Preferred specific example of the cyclic structure formed by said $A_1$ and $R_1$ includes, for example, cyclopentanone, cyclohexanone, or the like, and cyclohexanone is particularly preferable. Furthermore, n is preferably 1 in the case of forming such a ring.

As specific example of $A_1$ and $A_2$, —C(=O)—$R_3$, —O—$R_5$, —C(=O)—$OR_3$, —O—P(=O)($OR_5$)$_2$, —CN, or the like, is preferable, and —C(=O)—$R_3$, —O—$R_5$, —C(=O)—$OR_3$, or the like, is more preferable. Specifically, it includes a methylcarbonyl group, an ethylcarbonyl group, an n-propylcarbonyl group, an isopropylcarbonyl group, an n-butylcarbonyl group, an isobutylcarbonyl group, a sec-butylcarbonyl group, a tert-butylcarbonyl group, an n-pentylcarbonyl group, an isopentylcarbonyl group, a sec-pentylcarbonyl group, a tert-pentylcarbonyl group, a neopentylcarbonyl group, an n-hexylcarbonyl group, an isohexylcarbonyl group, a sec-hexylcarbonyl group, a tert-hexylcarbonyl group, a 3-methylpentylcarbonyl group, a 2-methylpentylcarbonyl group, a 1,2-dimethylbutylcarbonyl group, a cyclopropylcarbonyl group, a cyclopentylcarbonyl group, a cyclohexylcarbonyl group, a trifluoromethylcarbonyl group; a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a sec-pentyloxy group, a tert-pentyloxy group, a neopentyloxy group, an n-hexyloxy group, an isohexyloxy group, a sec-hexyloxy group, a tert-hexyloxy group, a neohexyloxy group, a cyclopropoxy group, a cyclopentyloxy group, a cyclohexyloxy group; a carboxyl group, a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, a tert-butoxycarbonyl group, an n-pentyloxycarbonyl group, an isopentyloxycarbonyl group, a sec-pentyloxycarbonyl group, a tert-pentyloxycarbonyl group, a neopentyloxycarbonyl group, an n-hexyloxycarbonyl group, an isohexyloxycarbonyl group, a sec-hexyloxycarbonyl group, a tert-hexyloxycarbonyl group, a neohexyloxycarbonyl group, a cyclopropoxycarbonyl group, a cyclopentyloxycarbonyl group, a cyclohexyloxycarbonyl group; a dimethylphosphonooxy group, a diethylphosphonooxy group, a di-n-propylphosphonooxy group, a diisopropylphosphonooxy group, a di-n-butylphosphonooxy group, a diisobutylphosphonooxy group, a di-sec-butylphosphonooxy group, a a di-tert-butylphosphonooxy group, a di-n-pentylphosphonooxy group, a diisopentylphosphonooxy group, a di-sec-pentylphosphonooxy group, a di-tert-pentylphosphonooxy group, a dineopentylphosphonooxy group, a di-n-hexylphosphonooxy group, a diisohexylphosphonooxy group, a di-sec-hexylphosphonooxy group, a di-tert-hexylphosphonooxy group, a di(3-methylpentyl)phosphonooxy group, a di(2-methylpentyl)phosphonooxy group, a di(1,2-dimethylbutyl)phosphonooxy group, a di(cyclopropyl)phosphonooxy group, a di(cyclopentyl)phosphonooxy group, a di(cyclohexyl) phosphonooxy group, a di(methoxyethyl)phosphonooxy group, a di(methoxy-n-propyl)phosphonooxy group, a di(methoxyisopropyl)phosphonooxy group, a di(ethoxyethyl)phosphonooxy group, a di(ethoxy-n-propyl)phosphonooxy group, a di(ethoxyisopropyl)phosphonooxy group, a di(n-propoxyethyl)phosphonooxy group, a di(n-propoxy-n-propyl)phosphonooxy group, a di(n-propoxyisopropyl)phosphonooxy group, a di(isopropoxyethyl)phosphonooxy group, a di(isopropoxy-n-propyl)phosphonooxy group, a di(isopropoxyisopropyl)phosphonooxy group, a di(n-butoxyethyl)phosphonooxy group, a di(n-butoxy-n-propyl) phosphonooxy group, a di(n-butoxyisopropyl)phosphonooxy group; a cyano group, or the like. Among them, a methylcarbonyl group, an ethylcarbonyl group, an n-propylcarbonyl group, an n-butylcarbonyl group, a tert-butylcarbonyl group; a methoxy group, an ethoxy group, an n-propoxy group, an n-butoxy group, a tert-butoxy group; a methoxycarbonyl group, an ethoxycarbonyl group, an n-propoxycarbonyl group, an n-butoxycarbonyl group, a tert-butoxycarbonyl group; a di(methoxyethyl)phosphonooxy group, a di(methoxy-n-propyl)phosphonooxy group, a di(methoxyisopropyl)phosphonooxy group, a di(ethoxyethyl)phosphonooxy group, a di(ethoxy-n-propyl)phosphonooxy group, a di(ethoxyisopropyl)phosphonooxy group, a di(n-propoxyethyl)phosphonooxy group, a di(n-propoxy-n-propyl)phosphonooxy group, a di(n-propoxyisopropyl) phosphonooxy group, a di(isopropoxyethyl)phosphonooxy group, a di(isopropoxy-n-propyl)phosphonooxy group, a di(isopropoxyisopropyl)phosphonooxy group, a di(n-butoxyethyl)phosphonooxy group, a di(n-butoxy-n-propyl) phosphonooxy group, a di(n-butoxyisopropyl)phosphonooxy group; a cyano group, or the like, are preferable.

Among them, a methylcarbonyl group, an ethylcarbonyl group, an n-propylcarbonyl group, an isopropylcarbonyl group, an n-butylcarbonyl group, an isobutylcarbonyl group, a sec-butylcarbonyl group, a tert-butylcarbonyl group, an n-pentylcarbonyl group, an isopentylcarbonyl group, a sec-pentylcarbonyl group, a tert-pentylcarbonyl group, a neopentylcarbonyl group, an n-hexylcarbonyl group, an isohexylcarbonyl group, a sec-hexylcarbonyl group, a tert-hexylcarbonyl group, a 3-methylpentylcarbonyl group, a 2-methylpentylcarbonyl group, a 1,2-dimethylbutylcarbonyl group, a cyclopropylcarbonyl group, a cyclopentylcarbonyl group, a cyclohexylcarbonyl group, a trifluoromethylcarbonyl group; a methoxy group, an ethoxy group, an n-propoxy group, an isopropoxy group, an n-butoxy group, an isobutoxy group, a sec-butoxy group, a tert-butoxy group, an n-pentyloxy group, an isopentyloxy group, a sec-pentyloxy group, a tert-pentyloxy group, a neopentyloxy group, an n-hexyloxy group, an isohexyloxy group, a sec-hexyloxy group, a tert-hexyloxy group, a neohexyloxy group, a cyclopropoxy group, a cyclopentyloxy group, a cyclohexyloxy group; a carboxyl group, a methoxycarbonyl group, an ethoxycarbonyl group, an n-propoxycarbonyl group, an isopropoxycarbonyl group, an n-butoxycarbonyl group, an isobutoxycarbonyl group, a sec-butoxycarbonyl group, a tert-butoxycarbonyl group, an n-pentyloxycarbonyl group, an isopentyloxycarbonyl group, a sec-pentyloxycarbonyl group, a tert-pentyloxycarbonyl group, a neopentyloxycarbonyl group, an n-hexyloxycarbonyl group, an isohexyloxycarbonyl group, a sec-hexyloxycarbonyl group, a tert-hexyloxycarbonyl group, a neohexyloxycarbonyl group, a cyclopropoxycarbonyl group, a cyclopentyloxycarbonyl group, a cyclohexyloxycarbonyl group, or the like, are preferable.

Specific example of the compound represented by general formula (I) includes, for example, following general formula (I-I)

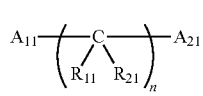

[wherein n is the same as the above-described one. n pieces of $R_{11}$ and n pieces of $R_{21}$ each independently represent a hydrogen atom, an alkyl group having 1 to 6 carbon atoms, $A_{11}$ and $A_{21}$ each independently represent —C(=O)—$R_{31}$, —O—$R_{51}$, —C(=O)—$OR_{31}$, —O—P(=O)($OR_{51}$)$_2$, —CN (the above-described $R_{31}$ represents a hydrogen atom, an alkyl group having 1 to 6 carbon atoms, $R_{51}$ represents an alkyl group having 1 to 6 carbon atoms), and a cyclic structure may be formed by $A_{11}$, $R_{11}$ and carbon located between them].

An alkyl group having 1 to 6 carbon atoms in $R_{11}$, $R_{21}$, $R_{31}$ or $R_{51}$ includes the same one as the above-describe alkyl group having 1 to 6 carbon atoms in $R_1$, $R_2$, $R_3$ or $R_5$, respectively, and the preferable group is also same one.

Specific example of $A_{11}$ and $A_{21}$ includes the same one as the preferred specific example of the above-described $A_1$ and $A_2$, and the preferable one is the same as this.

$A_{11}$ and $R_{11}$ may form a cyclic structure by $A_{11}$, carbon binding to $A_{11}$ and $R_{11}$, and $R_{11}$ binding to carbon thereof, when n is 1 to 6. Said cyclic structure includes, for example, a cycloalkane ring having 4 to 7 carbon atoms, and a 5 to 7 membered heterocyclic ring containing oxygen atom, nitrogen atom, sulfur atom, or the like, in a ring and they may have an oxo group as a substituent. Specific example of said cycloalkane ring includes a cyclobutyl ring, a cyclopentyl ring, a cyclohexyl ring, a cycloheptyl ring, or the like, and specific example of said heterocyclic ring includes pyrrolidine ring, piperidine ring, hexamethylene imine ring, oxolane ring, oxane ring, hexamethylene oxide ring, thiolane ring, thiane ring, hexamethylene sulfide ring, or the like. Preferred specific example of the above-described cyclic structure includes cyclopentanone, cyclohexanone, or the like, and, cyclohexanone is particularly preferable. Furthermore, n is preferably 1 in the case of forming such a ring.

Preferred combination of $A_{11}$, $A_{21}$, n, $R_{11}$ and $R_{21}$ in the above-described general formula (I-I) includes, for example, the one described in following Table 1.

TABLE 1

| Combination | $A_{11}$ | $A_{21}$ | n | $R_{11}$ | $R_{21}$ |
|---|---|---|---|---|---|
| 1 | —C(=O)—CH$_3$ | —C(=O)—CH$_3$ | 1 | Hydrogen atom | Hydrogen atom |
| 2 | —C(=O)—CH$_3$ | —C(=O)—C$_2$H$_5$ | 1 | Hydrogen atom | Hydrogen atom |
| 3 | —C(=O)—C$_2$H$_5$ | —C(=O)—C$_2$H$_5$ | 1 | Hydrogen atom | Hydrogen atom |
| 4 | —C(=O)—C$_3$H$_7$ | —C(=O)—C$_3$H$_7$ | 1 | Hydrogen atom | Hydrogen atom |
| 5 | —C(=O)—CH$_3$ | —C(=O)—CH$_3$ | 1 | —CH$_3$ | Hydrogen atom |
| 6 | —C(=O)—CH$_3$ | —C(=O)—CH$_3$ | 1 | —CH$_3$ | —CH$_3$ |
| 7 | Cyclohexanone is formed by $A_{11}$, $R_{11}$ and carbon sandwiched between them | —C(=O)—CH$_3$ | 1 | — | Hydrogen atom |
| 8 | —C(=O)—CH$_3$ | —C(=O)—CH$_3$ | 0 | — | — |
| 9 | —C(=O)—CF$_3$ | —C(=O)—CF$_3$ | 1 | Hydrogen atom | Hydrogen atom |
| 10 | —C(=O)—CF$_3$ | —C(=O)—CH$_3$ | 1 | Hydrogen atom | Hydrogen atom |
| 11 | —C(=O)—CH$_3$ | —O—CH$_3$ | 1 | Hydrogen atom | Hydrogen atom |
| 12 | —C(=O)—CH$_3$ | —O—C$_2$H$_5$ | 1 | Hydrogen atom | Hydrogen atom |
| 13 | —C(=O)—CH$_3$ | —O—C$_3$H$_7$ | 1 | Hydrogen atom | Hydrogen atom |
| 14 | —C(=O)—CH$_3$ | —C(=O)—OH | 1 | Hydrogen atom | Hydrogen atom |
| 15 | —C(=O)—CH$_3$ | —C(=O)—OCH$_3$ | 1 | Hydrogen atom | Hydrogen atom |
| 16 | —C(=O)—CH$_3$ | —C(=O)—OC$_2$H$_5$ | 1 | Hydrogen atom | Hydrogen atom |
| 17 | —C(=O)—CH$_3$ | —C(=O)—OC$_3$H$_7$ | 1 | Hydrogen atom | Hydrogen atom |
| 18 | —O—CH$_3$ | —C(=O)—OCH$_3$ | 1 | Hydrogen atom | Hydrogen atom |
| 19 | —O—CH$_3$ | —C(=O)—OC$_2$H$_5$ | 1 | Hydrogen atom | Hydrogen atom |
| 20 | —O—CH$_3$ | —C(=O)—OC$_3$H$_7$ | 1 | Hydrogen atom | Hydrogen atom |
| 21 | —O—C$_2$H$_5$ | —C(=O)—OCH$_3$ | 1 | Hydrogen atom | Hydrogen atom |
| 22 | —O—C$_2$H$_5$ | —C(=O)—OC$_2$H$_5$ | 1 | Hydrogen atom | Hydrogen atom |
| 23 | —O—C$_2$H$_5$ | —C(=O)—OC$_3$H$_7$ | 1 | Hydrogen atom | Hydrogen atom |
| 24 | —O—P(=O)(O—C$_2$H$_5$—OCH$_3$)$_2$ | —O—C$_2$H$_5$ | 2 | Hydrogen atom | Hydrogen atom |
| 25 | —O—P(=O)(O—C$_2$H$_5$—OC$_2$H$_5$)$_2$ | —O—C$_2$H$_5$ | 2 | Hydrogen atom | Hydrogen atom |
| 26 | —O—P(=O)(O—C$_2$H$_5$—OC$_3$H$_7$) 2 | —O—C$_3$H$_7$ | 2 | Hydrogen atom | Hydrogen atom |
| 27 | —CN | —CN | 1 | Hydrogen atom | Hydrogen atom |
| 28 | —CN | —CN | 2 | Hydrogen atom | Hydrogen atom |
| 29 | —CN | —CN | 3 | Hydrogen atom | Hydrogen atom |
| 30 | —CN | —CN | 4 | Hydrogen atom | Hydrogen atom |

3. Organic Solvent Pertaining to the Present Invention

In the electrolytic solution of the present invention, further, the organic solvent may be added other than the above-described supporting electrolyte pertaining to the present invention and the compound represented by the above-described general formula (I). It is preferable that said organic solvent is used in the case where viscosity of the compound represented by the above-described general formula (I) is high. In the electrolytic solution of the present invention, the one containing the organic solvent is preferable, because the addition of the organic solvent pertaining to the present invention is capable of showing higher current density.

Said organic solvent is the organic solvents other than the compound represented by the general formula (I), and includes the one composed of at least one kind selected from, for example, an ether-type solvent, an alcohol-type solvent, a carbonate-type solvent, an ester-type solvent, a nitrile-type solvent, a sulfone-type solvent, a halogen-type solvent, a hydrocarbon-type solvent, ionic liquid (ordinary temperature molten salt). Said ether-type solvent includes, for example, diethyl ether, tetrahydrofuran, 2-methyltetrahydrofuran, diisopropyl ether, 1,2-dimethoxyethane, diethyleneglycol dimethyl ether, triethylene glycol dimethyl ether, or the like. The alcohol-type solvent includes, for example, methanol, ethanol, 1-propanol, 2-propanol, 1-butanol, 2-butanol, 1-pentanol, cyclopentanol, 1-hexanol, cyclohexanol, or the like. The carbonate type solvent includes, for example, dimethyl carbonate, diethyl carbonate, ethyl methyl carbonate, propylene carbonate, or the like. The ester type solvent includes, for example, methyl formate, ethyl formate, butyl formate, methyl acetate, ethyl acetate, butyl acetate, methyl propionate, ethyl propionate, butyl propionate, butyrolactone, or the like. The nitrile-type solvent includes, for example, acetonitrile, propionitrile, butyronitrile, succinonitrile, pimelonitrile, or the like. The sulfone-type solvent includes, for example, dimethyl sulfone, diethyl sulfone, sulfolane, dipropyl sulfone, or the like. The halogen-type solvent includes, for example, dichloromethane, chloroform, carbon tetrachloride, 1,2-dichloroethane, chlorobenzene, or the like. The hydrocarbon-type solvent includes, for example, n-pentane, cyclopentane, n-hexane, cyclohexane, n-heptane, n-octane, isooctane, benzene, toluene, xylene, or the like. The ionic liquid (ordinary temperature molten salt) includes 1-ethyl-3-methylimidazolium tetrafluoroborate, 1-ethyl-3-methylimidazolium hexafluorophosphate, 1-ethyl-3-methylimidazolium trifluoromethanesulfonate, 1-ethyl-3-methylimidazolium bis(trifluoromethanesulfonyl)imide, 1-butyl-3-methylimidazolium tetrafluoroborate, 1-butyl-3-methylimidazolium hexafluorophosphate, 1-butyl-3-methylimidazolium trifluoromethanesulfonate, 1-butyl-3-methylimidazolium bis(trifluoromethanesulfonyl)imide, 1-ethyl-1-methylpyrrolidiniumhexafluorophosphate, 1-methyl-1-propylpyrrolidinium bis(trifluoromethanesulfonyl)imide, 1-methyl-1-propylpiperidinium bis(trifluoromethanesulfonyl)imide, 1-butyl-1-methylpyrrolidinium tetrafluoroborate, 1-butyl-1-methylpyrrolidinium bis(trifluoromethanesulfonyl)imide, tetraethyl ammonium trifluoromethane sulfonate, or the like. Among the above-described organic solvents, the ether-type solvent, the alcohol-type solvent, the carbonate-type solvent, the ester-type solvent, the nitrile-type solvent, the ionic liquid, or the like, are preferable, and among them, dimethoxyethane, 2-methyltetrahydrofuran, diethylene glycol dimethyl ether, propylene carbonate, acetonitrile, butyrolactone, ethanol, ethyl acetate, propionitrile, 1-ethyl-3-methylimidazolium trifluoromethane sulfonate, tetraethyl ammonium trifluoromethane sulfonate, or the like, are more preferable, and acetonitrile, propionitrile, 1-ethyl-3-methylimidazolium trifluoromethane sulfonate, tetraethyl ammonium trifluoromethane sulfonate are particularly preferable.

In the case where the above-described organic solvent is used, use amount thereof may be such amount that viscosity of the electrolytic solution decreases, in accordance with objects. Use amount the organic solvent may be preferably 90% v/v or lower, and more preferably 80% v/v or lower, in the electrolytic solution.

4. Electrolytic Solution of the Present Invention

The electrolytic solution of the present invention comprises the supporting electrolyte comprised of the above-described magnesium salt, and at least one kind or more of the compounds represented by the above-described general formula (I), and further comprises the organic solvent pertaining to the present invention, if needed.

The electrolytic solution of the present invention may contain the additives, such as a film forming agent, an over charge prevention agent, an deoxidizing agent, a dehydration agent, a flame retardant, or the like, usually used in this field.

Concentration of the supporting electrolyte in the electrolytic solution of the present invention is usually 0.1 to 5.0 mol/L, preferably 0.1 to 3.0 mol/L, and more preferably 0.5 to 3.0 mol/L.

Amount of the compound represented by general formula (I) in the electrolytic solution of the present invention is usually 2 mol, and preferably 5 mol, as the lower limit, and usually 30 mol, and preferably 20 mol, as the upper limit, relative to 1 mol of the supporting electrolyte.

In the case where the electrolytic solution of the present invention contains the organic solvent, volume ratio of the organic solvent and the compound represented by general formula (I) is usually 1:99 to 90:10, and preferably 1:99 to 50:50.

5. Preparation Method for Electrolytic Solution

As a preparation method for the electrolytic solution of the present invention, the supporting electrolyte pertaining to the present invention may be dissolved in the compound represented by the above-described general formula (I), or a mixed solution of the compound represented by the above-described general formula (I) and the above-described organic solvent, so as to be the above-described concentration. Specifically, it is attained by dissolving the supporting electrolyte by contacting them usually at 20 to 120° C., preferably 50 to 90° C., and more preferably 60 to 80° C., for usually 1 to 20 hours, preferably 1 to 10 hours, and more preferably 5 to 10 hours. It should be noted that it is preferable to be subjected to dehydration treatment after dissolution, and said dehydration treatment may be carried out by adding a dehydration agent, for example, a molecular sieve, or the like, in an amount of, for example, 0.5 to 10 g to 20 mL of the electrolytic solution.

6. Electrolytic Solution Prepared from Complex

The supporting electrolyte comprised of a magnesium salt in the electrolytic solution of the present invention is considered to form a magnesium complex by binding with the compound represented by general formula (I). Accordingly, the electrolytic solution of the present invention may be prepared by preparing such a magnesium complex (hereafter it may also be abbreviated as the magnesium complex pertaining to the present invention), in advance, and dissolving said complex pertaining to the present invention in the above-described organic solvent pertaining to the present invention. In the case where the electrolytic solution is prepared using the complex pertaining to the present invention, the complex may be dissolved in the compound pertaining to the present invention, the organic solvent pertaining to the present invention, or a mixed solution thereof, so that, for example, concentration of the complex attains the same concentration range of the supporting electrolyte in the above-described electrolytic solution of the present invention.

Said complex may be the one in which two molecules of the general formula (I) coordinate with one molecule of magnesium salt represented by general formula (II), and specifically includes the complex represented by following general formula (V):

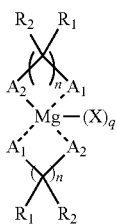

(wherein Mg, X, q, $A_1$, $A_2$, n, $R_1$ and $R_2$ are the same as the above-described one. Cordinate bonds with $A_1$ and magnesium ion, and $A_2$ and magnesium ion represent a bond with oxygen atom, sulfur atom, or nitrogen atom in $A_1$ and $A_2$).

Specific example of X, q, $A_1$, $A_2$, n, $R_1$, $R_2$ in the complex represented by the above-described general formula (V) includes the same one as described above in section 1 of the supporting electrolyte and section 2 of the compound, and the preferable one is the same one.

Preferred specific example of the complex represented by general formula (V) includes the complex represented by following general formula (V-I)

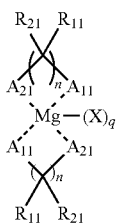

(wherein Mg, X, q, $A_{11}$, $A_{21}$, n, $R_{11}$ and $R_{21}$ are the same one as described above. Cordinate bonds with $A_{11}$ and magnesium ion, and $A_{21}$ and magnesium ion represent a bond with oxygen atom, sulfur atom, or nitrogen atom in $A_{11}$ and $A_{21}$).

A preferred combination of X, q, $A_{11}$, $A_{21}$, n, $R_{11}$ and $R_{21}$ in the complex represented by general formula (V-I) includes the appropriately combined one of the combination of $A_{11}$, $A_{21}$, n, $R_{11}$ and $R_{21}$ in the above-described Table 1, and the combination of the following X and q.

TABLE 2

| No. | X | q |
|---|---|---|
| 1 | trifluoromethane sulfonate ion | 2 |
| 2 | bromide ion (Br$^-$) | 2 |
| 3 | chloride ion (Cl$^-$) | 2 |
| 4 | iodide ion (I$^-$) | 2 |

TABLE 2-continued

| No. | X | q |
|---|---|---|
| 5 | tetrafluoroborate ion | 2 |
| 6 | bis(trifluoromethanesulfonyl)imide | 2 |

As a preparation method for the above-described complex, the above-described compound represented by general formula (I) may be added in an amount of 2 to 10 mole equivalents, preferably 5 to 10 mole equivalents, for example, to the supporting electrolyte pertaining to the present invention of 1 mole and reacted at usually 20 to 120° C., preferably 50 to 90° C., and more preferably 60 to 80° C., for usually 1 to 20 hours, preferably 1 to 10 hours, and more preferably 5 to 10 hours. It should be noted that the compound represented by general formula (I) may be added in excess amount, depending on solubility thereof, and the above-described organic solvent pertaining to the present invention may be added further as a solvent. After dissolution, the complex may be deposited by adding a suitable poor solvent, if needed, after removing the solvent by concentration, or the like, if needed.

Electrochemical Device

The electrolytic solution of the present invention can be used as the electrolytic solution for the electrochemical device which contains magnesium as a negative electrode active material, and for the electrochemical device which is capable of forming an electric double-layer by intercalation (intercalation, deintercalation) of magnesium ions to an electrode. As said electrochemical device, a secondary battery, an electric double-layer capacitor, or the like, are included, and the secondary battery is particularly preferable.

The electrochemical device using the electrolytic solution of the present invention may be such one, where the negative electrode active substance contains magnesium, as described above, and it is comprised of the above-described electrolytic solution of the present invention, a positive electrode, a negative electrode and a separator.

The positive electrode is not especially limited, as long as being a transition metal oxide which is capable of intercalating magnesium ions, and for example, all of those described in the NON PATENT LITERATURE 3 can be used.

The negative electrode is not especially limited, as long as the active substance thereof contains magnesium, and dissolution and deposition of the magnesium ions are possible, and includes, for example, metal magnesium, magnesium alloys, carbon materials, or the like.

The separator is not especially limited, as long as it electrically insulates the positive electrode and the negative electrode, as well as is capable of transmitting the magnesium ions, and specifically includes, a micro-porous polymer film such as, for example, a porous polyolefin film. Specific example of the porous polyolefin film includes, for example, a porous polyethylene film alone, or a multi-layer film made by laminating a porous polyethylene film and a porous polypropylene film, or the like.

Explanation on the present invention will be given below more specifically with reference to Examples and Comparative Examples, however, the present invention should not be limited thereby at all.

EXAMPLES

Example 1 Preparation of Bis(Trifluoromethanesulfonyl)Imide Magnesium (Mg(TFSI)$_2$)/Acetylacetone Solution Under argon gas atmosphere, 8.78 g of bis(trifluoromethanesulfonyl)imide magnesium (Mg(TFSI)$_2$) (produced by Kishida Chemical Co., Ltd.), and 25 mL of acetylacetone (produced by Wako Pure Chemical Industries, Ltd.) were charged in a reactor and stirred. After filtration of an insoluble matter by suction filtration, 50% by weight of a molecular sieve (MS3A, produced by Wako Pure Chemical Industries, Ltd.) was added to the mother liquor, and was subjected to dehydration treatment to prepare an acetylacetone solution containing 0.5 M of Mg(TFSI)$_2$. Said solution was adopted as an electrolytic solution 1.

Example 2 Preparation of Mg(TFSI)$_2$/Acetylacetone:Acetonitrile (1:1) Mixed Solution By similar treatment as in Example 1, except for using a mixed solution of 12.5 mL of acetylacetone (produced by Wako Pure Chemical Industries, Ltd.) and 12.5 mL of acetonitrile (produced by Wako Pure Chemical Industries, Ltd.), instead of 25 mL of acetylacetone of Example 1, as a solvent, a mixed solution of acetylacetone and acetonitrile containing 0.5 M of Mg(TFSI)$_2$ was prepared. Said solution was adopted as an electrolytic solution 2.

Example 3 Preparation of an Mg(TFSI)$_2$/Acetylacetone:Propionitrile (1:1) Mixed Solution By similar treatment as in Example 1, except for using a mixed solution of 12.5 mL of acetylacetone (produced by Wako Pure Chemical Industries, Ltd.) and 12.5 mL of propionitrile (produced by Wako Pure Chemical Industries, Ltd.), instead of 25 mL of acetylacetone of Example 1, as a solvent, a mixed solution of acetylacetone and propionitrile containing 0.5 M of Mg(TFSI)$_2$ was prepared. Said solution was adopted as an electrolytic solution 3.

Example 4 Preparation of Mg(TFSI)$_2$/1,1,1,5,5,5-Hexafluoroacetylacetone:Acetonitrile (1:1) Mixed Solution By similar treatment as in Example 1, except for using a mixed solution of 12.5 mL of 1,1,1,5,5,5-hexafluoroacetylacetone (produced by Wako Pure Chemical Industries, Ltd.) and 12.5 mL of acetonitrile (produced by Wako Pure Chemical Industries, Ltd.), instead of 25 mL of acetylacetone of Example 1, as a solvent, a mixed solution of 1,1,1,5,5,5-hexafluoroacetylacetone and acetonitrile containing 0.5 M of Mg(TFSI)$_2$ was prepared. Said solution was adopted as an electrolytic solution 4.

Example 5 Preparation of Mg(TFSI)$_2$/3-Methyl-2,4-Pentanedione Solution

By similar treatment as in Example 1, except for using 25 mL of 3-methyl-2,4-pentanedione (produced by Wako Pure Chemical Industries, Ltd.), instead of 25 mL of acetylacetone of Example 1, as a solvent, a solution of 3-methyl-2,4-pentanedione containing 0.5 M of Mg(TFSI)$_2$ was prepared. Said solution was adopted as an electrolytic solution 5.

Example 6 Preparation of Mg(TFSI)$_2$/2-Acetylcyclohexanone Solution

By similar treatment as in Example 1, except for using 25 mL of 2-acetylcyclohexanone (produced by Wako Pure Chemical Industries, Ltd.), instead of 25 mL of acetylacetone of Example 1, as a solvent, a solution of 2-acetylcyclohexanone containing 0.5 M of Mg(TFSI)$_2$ was prepared. Said solution was adopted as an electrolytic solution 6.

Example 7 Preparation of an Mg(TFSI)$_2$/3,3-Dimethyl-2,4-Pentanedione Solution By similar treatment as in Example 1, except for using 25 mL of 3,3-dimethyl-2,4-pentanedione (produced by Wako Pure Chemical Industries, Ltd.), instead of 25 mL of acetylacetone of Example 1, as a solvent, a solution of 3,3-dimethyl-2,4-pentanedione containing 0.5 M of Mg(TFSI)$_2$ was prepared. Said solution was adopted as an electrolytic solution 7.

Example 8 Preparation of Mg(TFSI)$_2$/2,3-Butanedione Solution

By similar treatment as in Example 1, except for using 25 mL of 2,3-butanedione (produced by Wako Pure Chemical Industries, Ltd.), instead of 25 mL of acetylacetone of Example 1, as a solvent, a solution of 2,3-butanedione containing 0.5 M of Mg(TFSI)$_2$ was prepared. Said solution was adopted as an electrolytic solution 8.

Example 9 Preparation of Mg(TFSI)$_2$/Methoxyacetone Solution

By similar treatment as in Example 1, except for using 25 mL of methoxyacetone (produced by Wako Pure Chemical Industries, Ltd.), instead of 25 mL of acetylacetone of Example 1, as a solvent, a solution of methoxyacetone containing 0.5 M of Mg(TFSI)$_2$ was prepared. Said solution was adopted as an electrolytic solution 9.

Example 10 Preparation of Mg(TFSI)$_2$/Pyruvic Acid Solution

By similar treatment as in Example 1, except for using 25 mL of pyruvic acid (produced by Wako Pure Chemical Industries, Ltd.), instead of 25 mL of acetylacetone of Example 1, as a solvent, a solution of pyruvic acid containing 0.5 M of Mg(TFSI)$_2$ was prepared. Said solution was adopted as an electrolytic solution 10.

Example 11 Preparation of Mg(TFSI)$_2$/Ethyl Acetoacetate Solution

By similar treatment as in Example 1, except for using 25 mL of ethyl acetoacetate (produced by Wako Pure Chemical Industries, Ltd.), instead of 25 mL of acetylacetone of Example 1, as a solvent, a solution of ethyl acetoacetate containing 0.5 M of Mg(TFSI)$_2$ was prepared. Said solution was adopted as an electrolytic solution 11.

Example 12 Preparation of Mg(TFSI)$_2$/Methyl Metoxyacetate Solution

By similar treatment as in Example 1, except for using 25 mL of methyl metoxyacetate (produced by Wako Pure Chemical Industries, Ltd.), instead of 25 mL of acetylacetone of Example 1, as a solvent, a solution of methyl metoxyacetate containing 0.5 M of Mg(TFSI)$_2$ was prepared. Said solution was adopted as an electrolytic solution 12.

Example 13 Preparation of Mg(TFSI)$_2$/3-Methoxypropionitrile Solution

By similar treatment as in Example 1, except for using 25 mL of 3-methoxypropionitrile (produced by Wako Pure Chemical Industries, Ltd.), instead of 25 mL of acetylacetone of Example 1, as a solvent, a solution of 3-methoxypropionitrile containing 0.5 M of Mg(TFSI)$_2$ was prepared. Said solution was adopted as an electrolytic solution 13.

Example 14 Preparation of Mg(TFSI)$_2$/Tri(2-Methoxyethyl) Phosphate Solution By similar treatment as in Example 1, except for using 25 mL of tri(2-methoxyethyl) phosphate (produced by Wako Pure Chemical Industries, Ltd.), instead of 25 mL of acetylacetone of Example 1, as a solvent, a solution of tri(2-methoxyethyl) phosphate containing 0.5 M of Mg(TFSI)$_2$ was prepared. Said solution was adopted as an electrolytic solution 14.

Example 15 Preparation of Mg(TFSI)$_2$/Adiponitrile Solution

By similar treatment as in Example 1, except for using 25 mL of adiponitrile (produced by Wako Pure Chemical Industries, Ltd.), instead of 25 mL of acetylacetone of Example 1, as a solvent, a solution of adiponitrile containing 0.5 M of Mg(TFSI)$_2$ was prepared. Said solution was adopted as an electrolytic solution 15.

Example 16 Preparation of Magnesium Bromide (MgBr$_2$)/Methoxyacetone Solution By similar treatment as in Example 9, except for using 2.76 g of MgBr$_2$ (produced by Wako Pure Chemical Industries, Ltd.), instead of 8.78 g of Mg(TFSI)$_2$ of Example 9, as the supporting electrolyte, a methoxyacetone solution containing 0.1 M of MgBr$_2$ was prepared. Said solution was adopted as an electrolytic solution 16.

Example 17 Preparation of MgBr$_2$/Ethyl Acetoacetate Solution

By similar treatment as in Example 11, except for using 2.76 g of MgBr$_2$ (produced by Wako Pure Chemical Industries, Ltd.), instead of 8.78 g of Mg(TFSI)$_2$ of Example 11, as the supporting electrolyte, an ethyl acetoacetate solution containing 0.1 M of MgBr$_2$ was prepared. Said solution was adopted as an electrolytic solution 17.

Example 18 Preparation of MgBr$_2$/Methyl Metoxyacetate Solution

By similar treatment as in Example 12, except for using 2.76 g of MgBr$_2$ (produced by Wako Pure Chemical Industries, Ltd.), instead of 8.78 g of Mg(TFSI)$_2$ of Example 12, as the supporting electrolyte, a methyl metoxyacetate solution containing 0.1 M of MgBr$_2$ was prepared. Said solution was adopted as an electrolytic solution 18.

Example 19 Preparation of MgBr$_2$/3-Methoxypropionitrile Solution

By similar treatment as in Example 13, except for using 2.76 g of MgBr$_2$ (produced by Wako Pure Chemical Industries, Ltd.), instead of 8.78 g of Mg(TFSI)$_2$ of Example 13, as the supporting electrolyte, a 3-methoxypropionitrile solution containing 0.5 M of MgBr$_2$ was prepared. Said solution was adopted as an electrolytic solution 19.

Example 20 Preparation of MgBr$_2$/Tri(2-Methoxyethyl) Phosphate Solution

By similar treatment as in Example 14, except for using 2.76 g of MgBr$_2$ (produced by Wako Pure Chemical Industries, Ltd.), instead of 8.78 g of Mg(TFSI)$_2$ of Example 14, as the supporting electrolyte, a tri(2-methoxyethyl) phosphate solution containing 0.3 M of MgBr$_2$ was prepared. Said solution was adopted as an electrolytic solution 20.

Example 21 Preparation of MgBr$_2$/Adiponitrile Solution

By similar treatment as in Example 15, except for using 2.76 g of MgBr$_2$ (produced by Wako Pure Chemical Industries, Ltd.), instead of 8.78 g of Mg(TFSI)$_2$ of Example 15, as the supporting electrolyte, an adiponitrile solution containing 0.1 M of MgBr$_2$ was prepared. Said solution was adopted as an electrolytic solution 21.

Example 22 Preparation of Magnesium Trifluoromethanesulfonate (Mg(OTf)$_2$/Tri(2-Methoxyethyl) Phosphate Solution By similar treatment as in Example 14, except for using 4.84 g of Mg(OTf)$_2$ (produced by Tokyo Chemical Industry Co., Ltd.), instead of 8.78 g of Mg(TFSI)$_2$ of Example 14, as the supporting electrolyte, a tri(2-methoxyethyl) phosphate solution containing 0.1 M of Mg(OTf)$_2$ was prepared. Said solution was adopted as an electrolytic solution 22.

Example 23 Preparation of Mg(OTf)$_2$/Adiponitrile Solution

By similar treatment as in Example 15, except for using 4.84 g of Mg(OTf)$_2$ (produced by Tokyo Chemical Industry Co., Ltd.), instead of 8.78 g of Mg(TFSI)$_2$ of Example 15, as the supporting electrolyte, an adiponitrile solution containing 0.3 M of Mg(OTf)$_2$ was prepared. Said solution was adopted as an electrolytic solution 23.

Example 24 Preparation of Mg(OTf)$_2$/Acetylacetone Solution

By similar treatment as in Example 1, except for using 4.84 g of Mg(OTf)$_2$ (produced by Tokyo Chemical Industry Co., Ltd.), instead of 8.78 g of Mg(TFSI)$_2$ of Example 1, as the supporting electrolyte, an acetylacetone solution containing 0.1 M of Mg(OTf)$_2$ was prepared. Said solution was adopted as an electrolytic solution 24.

A list of the resulting electrolytic solutions in the above-described Examples 1 to 24 is shown in following Table 3.

TABLE 3

| Example | Electrolytic solution | Supporting electrolyte | Concentration of electrolyte (M) | Solvent name | Solvent structure |
|---|---|---|---|---|---|
| Example 1 | Electrolytic solution 1 | Mg (TFSI)$_2$ | 0.5 | acetylacetone | 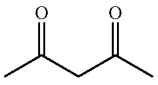 |
| Example 2 | Electrolytic solution 2 | Mg (TFSI)$_2$ | 0.5 | acetylacetone: acetonitrile (1:1) | 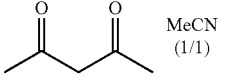 MeCN (1/1) |
| Example 3 | Electrolytic solution 3 | Mg (TFSI)$_2$ | 0.5 | acetylacetone: propionitrile (1:1) | 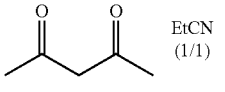 EtCN (1/1) |
| Example 4 | Electrolytic solution 4 | Mg (TFSI)$_2$ | 0.5 | 1,1,1,5,5,5-hexafluoroacetylacetone/ acetonitrile (1:1) | 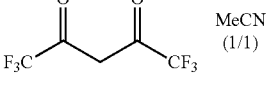 MeCN (1/1) |
| Example 5 | Electrolytic solution 5 | Mg (TFSI)$_2$ | 0.5 | 3-methyl-2,4-pentanedione | 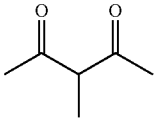 |
| Example 6 | Electrolytic solution 6 | Mg (TFSI)$_2$ | 0.5 | 2-acetylcyclohexanone | 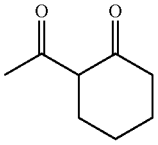 |
| Example 7 | Electrolytic solution 7 | Mg (TFSI)$_2$ | 0.5 | 3,3-dimethyl-2,4-pentanedione | 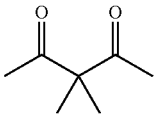 |
| Example 8 | Electrolytic solution 8 | Mg (TFSI)$_2$ | 0.5 | 2,3-butanedione | 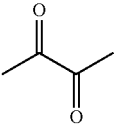 |
| Example 9 | Electrolytic solution 9 | Mg (TFSI)$_2$ | 0.5 | methoxyacetone | 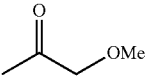 |
| Example 10 | Electrolytic solution 10 | Mg (TFSI)$_2$ | 0.5 | pyruvic acid | 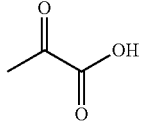 |
| Example 11 | Electrolytic solution 11 | Mg (TFSI)$_2$ | 0.5 | ethyl acetoacetate | 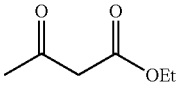 |
| Example 12 | Electrolytic solution 12 | Mg (TFSI)$_2$ | 0.5 | methyl metoxyacetate | 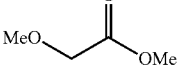 |
| Example 13 | Electrolytic solution 13 | Mg (TFSI)$_2$ | 0.5 | 3-methoxypropionitrile | 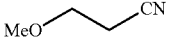 |
| Example 14 | Electrolytic solution 14 | Mg (TFSI)$_2$ | 0.5 | tri (2-methoxyethyl) phosphate | 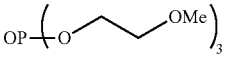 |

TABLE 3-continued

| Example | Electrolytic solution | Supporting electrolyte | Concentration of electrolyte (M) | Solvent name | Solvent structure |
|---|---|---|---|---|---|
| Example 15 | Electrolytic solution 15 | Mg (TFSI)$_2$ | 0.5 | adiponitrile | NC–(CH$_2$)$_4$–CN |
| Example 16 | Electrolytic solution 16 | MgBr$_2$ | 0.1 | methoxyacetone | CH$_3$C(O)CH$_2$OMe |
| Example 17 | Electrolytic solution 17 | MgBr$_2$ | 0.1 | ethyl acetoacetate | CH$_3$C(O)CH$_2$C(O)OEt |
| Example 18 | Electrolytic solution 17 | MgBr$_2$ | 0.1 | methyl metoxyacetate | MeOCH$_2$C(O)OMe |
| Example 19 | Electrolytic solution 19 | MgBr$_2$ | 0.5 | 3-methoxypropionitrile | MeOCH$_2$CH$_2$CN |
| Example 20 | Electrolytic solution 20 | MgBr$_2$ | 0.3 | tri (2-methoxyethyl) phosphate | OP(OCH$_2$CH$_2$OMe)$_3$ |
| Example 21 | Electrolytic solution 21 | MgBr$_2$ | 0.1 | adiponitrile | NC–(CH$_2$)$_4$–CN |
| Example 22 | Electrolytic solution 22 | Mg (OTf)$_2$ | 0.1 | tri (2-methoxyethyl) phosphate | OP(OCH$_2$CH$_2$OMe)$_3$ |
| Example 23 | Electrolytic solution 23 | Mg (OTf)$_2$ | 0.3 | adiponitrile | NC–(CH$_2$)$_4$–CN |
| Example 24 | Electrolytic solution 24 | Mg (OTf)$_2$ | 0.1 | acetylacetone | CH$_3$C(O)CH$_2$C(O)CH$_3$ |

Example 25 Measurement of Cyclic Voltammetry (CV) Using the Electrolytic Solution 1

CV measurement was carried out using the electrolytic solution 1 to examine electric characteristics of the electrolytic solution 1.

Specifically, using a three-pole type beaker cell, magnesium (0.5 cm$^2$), platinum and magnesium were used for a working electrode, a counter electrode and a reference electrode, respectively. In addition, 2 ml of the electrolytic solution 1 was added into the beaker to carry out the measurement under conditions of at room temperature (20° C.), a sweep rate of 5 mV/s, and in a range of −1.5 to 1 V. It should be noted that the sweep was carried out two cycles. In said measurement, an electrochemical analyzer, ALS model 600A (manufactured by BAS Inc.) was used. Results thereof are shown in FIG. 1.

In FIG. 1, the horizontal axis (V) shows potential difference of the working electrode, based on potential of the reference electrode, and the vertical axis (mA/cm$^2$) shows a current density obtained from dividing a current value observed at each potential by surface area of the working electrode. Hereafter, the horizontal axis and the vertical axis in graphs showing CV measurement results represent the same as the above.

From the results of FIG. 1, oxidation current was observed in association with dissolution of magnesium from the working electrode, from the vicinity of 0.3 V, and current density at the vicinity of 1 V was about 10.8 mA/cm$^2$. On the other hand, reduction current was observed in association with deposition of magnesium at the working electrode, from the vicinity of −0.2 V, and current density at the vicinity of −1.5 V was about −22.6 mA/cm$^2$. Therefore, it has been clarified that by using the electrolytic solution 1, a reversible oxidation-reduction reaction of magnesium occurred, and thus gave high current density. Still more, it has also been clarified that dissolution and deposition of magnesium progress repeatedly and stably, because decrease in current density was not observed, even in sweep at or subsequent to the second cycle.

Example 26 Measurement of Cyclic Voltammetry (CV) Using the Electrolytic Solution 2

CV measurement was performed similarly as the method in Example 25, except for using the electrolytic solution 2 as the electrolytic solution. Results thereof are shown in FIG. 2.

Figure 2:
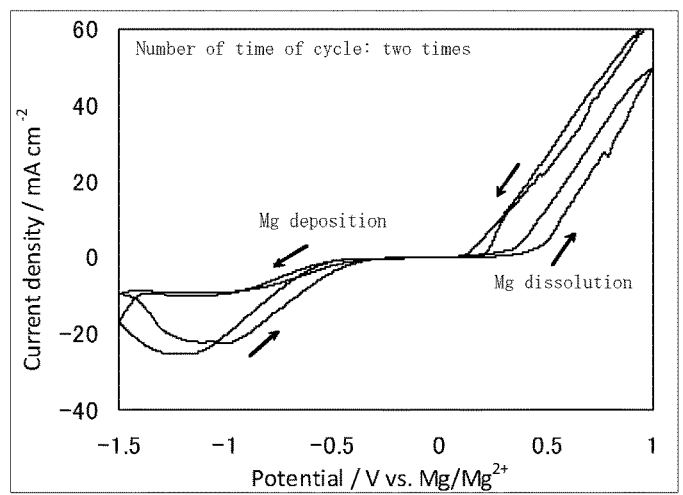
FIG. 2 is a graph showing CV measurement result using the electrolytic solution 2 (Mg(TFSI)$_2$/acetylacetone:acetonitrile (1:1) mixed solution) in Example 26.

As is clear from the results of FIG. 2, oxidation current was observed in association with dissolution of Mg from the vicinity of 0.3 V, and current density at the vicinity of 1 V was about 58.6 mA/cm$^2$. On the other hand, reduction current was observed in association with deposition of Mg from the vicinity of −0.3 V, and current density at the vicinity of −1.5 V was about −17.1 mA/cm$^2$. Therefore, it has been clarified that by using the electrolytic solution 2, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 27 Measurement of Cyclic Voltammetry (CV) Using the Electrolytic Solution 3

CV measurement was performed similarly as the method in Example 25, except for using the electrolytic solution 3 as the electrolytic solution. Results thereof are shown in FIG. 3.

Figure 3:
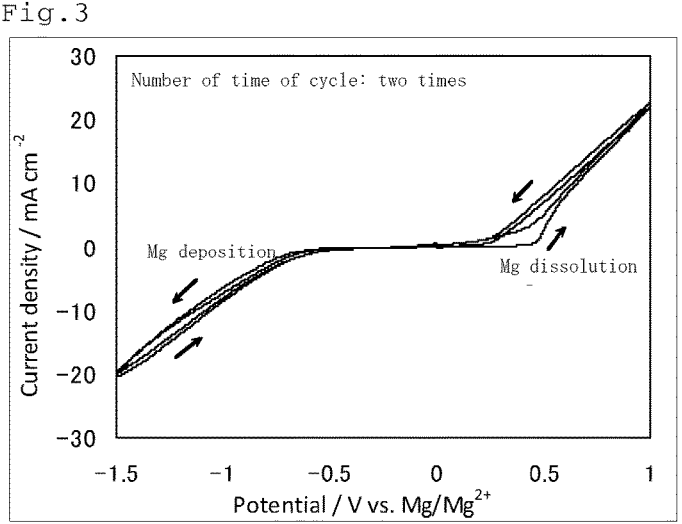
FIG. 3 is a graph showing CV measurement result using the electrolytic solution 3 (Mg(TFSI)$_2$/acetylacetone:propionitrile (1:1) mixed solution) in Example 27.

As is clear from the results of FIG. 3, oxidation current was observed in association with dissolution of Mg from the vicinity of 0.4 V, and current density at the vicinity of 1 V was about 22.0 mA/cm$^2$. On the other hand, reduction current was observed in association with deposition of Mg from the vicinity of −0.5 V, and current density at the vicinity of −1.5 V was about −19.2 mA/cm$^2$. Therefore, it has been clarified that by using the electrolytic solution 3, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 28 Measurement of Cyclic Voltammetry (CV) Using the Electrolytic Solution 4

CV measurement was performed similarly as the method in Example 25, except for using the electrolytic solution 4 as the electrolytic solution. Results thereof are shown in FIG. 4.

Figure 4:
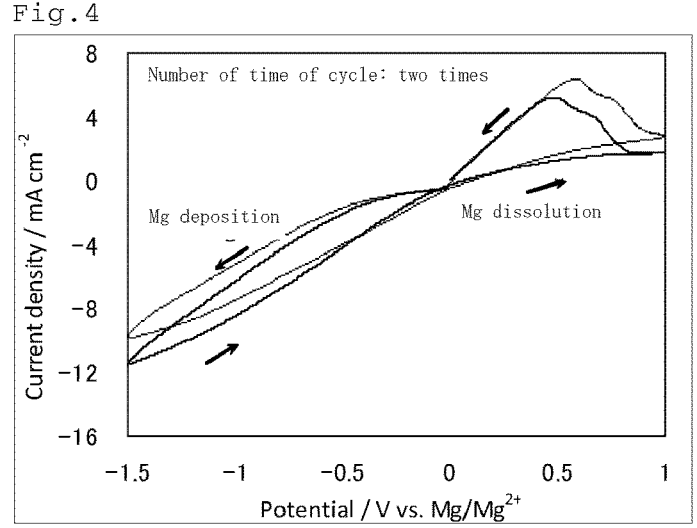
FIG. 4 is a graph showing CV measurement result using the electrolytic solution 4 (Mg(TFSI)$_2$/1,1,1,5,5,5-hexafluoroacetylacetone:acetonitrile (1:1) mixed solution) in Example 28.

As is clear from the results of FIG. 4, oxidation current was observed in association with dissolution of Mg from the vicinity of 0 V, and current density at the vicinity of 0.5 V was about 6.2 mA/cm$^2$. On the other hand, reduction current was observed in association with deposition of Mg from the vicinity of −0.1 V, and current density at the vicinity of −1.5 V was about −11.3 mA/cm$^2$. Therefore, it has been clarified that by using the electrolytic solution 4, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 29 Measurement of Cyclic Voltammetry (CV) Using the Electrolytic Solution 5

CV measurement was performed similarly as the method in Example 25, except for using the electrolytic solution 5 as the electrolytic solution. Results thereof are shown in FIG. 5.

Figure 5:
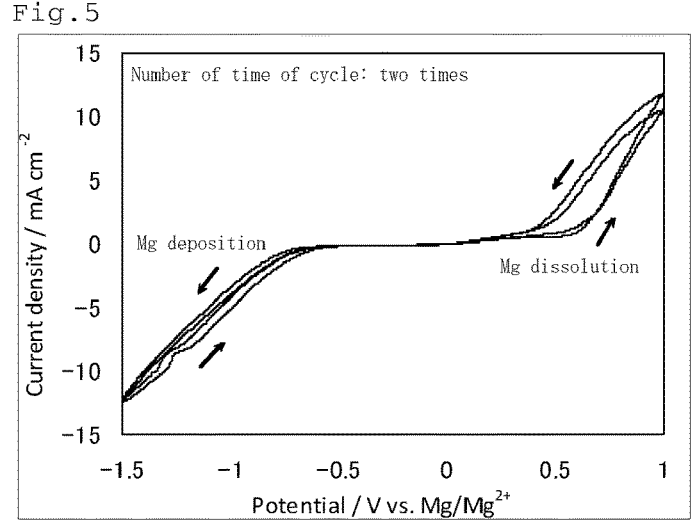
FIG. 5 is a graph showing CV measurement result using the electrolytic solution 5 (Mg(TFSI)$_2$/3-methyl-2,4-pentanedione solution) in Example 29.

As is clear from the results of FIG. 5, oxidation current was observed in association with dissolution of Mg from the vicinity of 0.5 V, and current density at the vicinity of 1 V was about 11.5 mA/cm$^2$. On the other hand, reduction current was observed in association with deposition of Mg from the vicinity of −0.5 V, and current density at the vicinity of −1.5 V was about −11.9 mA/cm$^2$. Therefore, it has been clarified that by using the electrolytic solution 5, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 30 Measurement of Cyclic Voltammetry (CV) Using the Electrolytic Solution 6

CV measurement was performed similarly as the method in Example 25, except for using the electrolytic solution 6 as the electrolytic solution. Results thereof are shown in FIG. 6.

Figure 6:
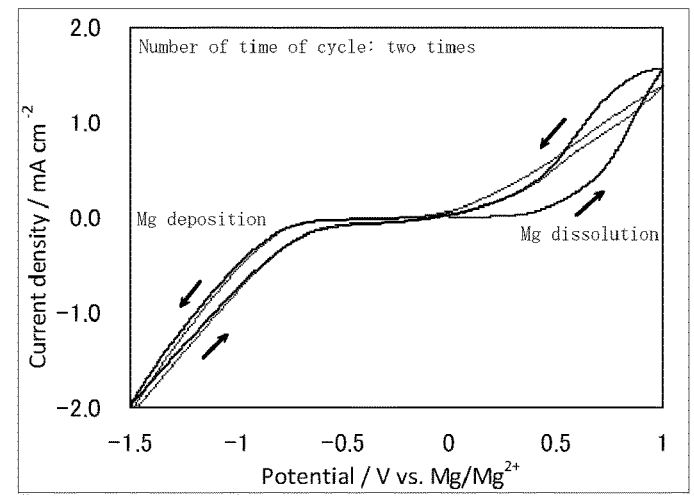
FIG. 6 is a graph showing CV measurement result using the electrolytic solution 6 (Mg(TFSI)$_2$/2-acetylcyclohexanone solution) in Example 30.

As is clear from the results of FIG. 6, oxidation current was observed in association with dissolution of Mg from the vicinity of 0.4 V, and current density at the vicinity of 1 V was about 1.6 mA/cm$^2$. On the other hand, reduction current was observed in association with deposition of Mg from the vicinity of −0.5 V, and current density at the vicinity of −1.5 V was about −2.0 mA/cm$^2$. Therefore, it has been clarified that by using the electrolytic solution 6, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 31 Measurement of Cyclic Voltammetry (CV) Using the Electrolytic Solution 7

CV measurement was performed similarly as the method in Example 25, except for using the electrolytic solution 7 as the electrolytic solution. Results thereof are shown in FIG. 7.

Figure 7:
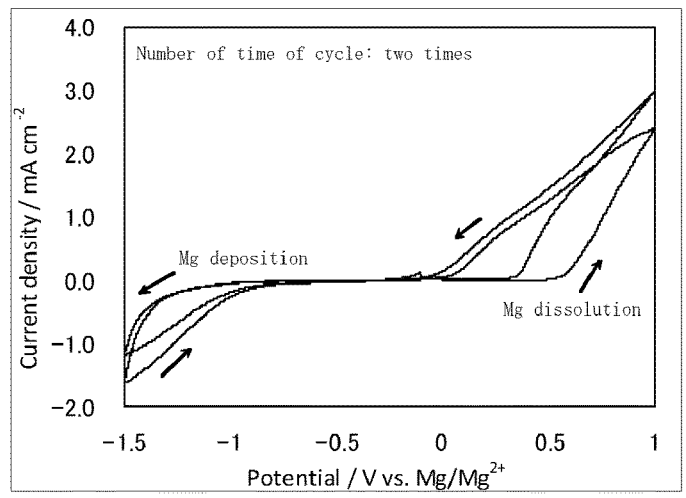
FIG. 7 is a graph showing CV measurement result using the electrolytic solution 7 (Mg(TFSI)$_2$/3,3-dimethyl-2,4-pentanedione solution) in Example 31.

As is clear from the results of FIG. 7, oxidation current was observed in association with dissolution of Mg from the vicinity of 0.5 V, and current density at the vicinity of 1 V was about 2.9 mA/cm$^2$. On the other hand, reduction current was observed in association with deposition of Mg from the vicinity of −0.8 V, and current density at the vicinity of −1.5 V was about −1.5 mA/cm$^2$. Therefore, it has been clarified that by using the electrolytic solution 7, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 32 Measurement of Cyclic Voltammetry (CV) Using the Electrolytic Solution 9

CV measurement was performed similarly as the method in Example 25, except for using the electrolytic solution 9 as the electrolytic solution. Results thereof are shown in FIG. 8.

Figure 8:
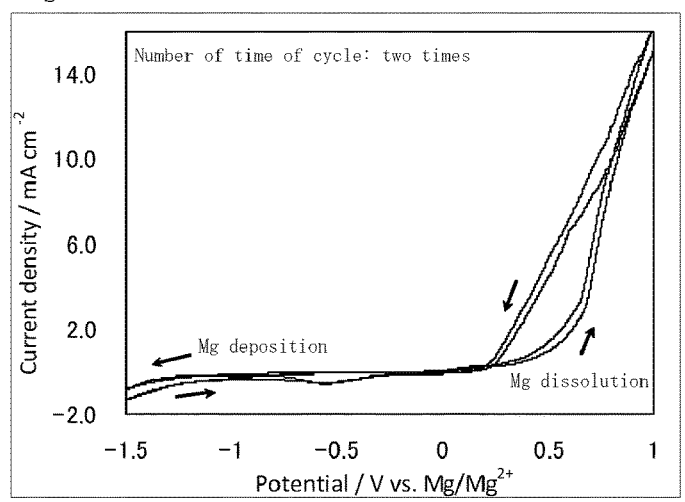
FIG. 8 is a graph showing CV measurement result using the electrolytic solution 9 (an Mg(TFSI)$_2$/methoxyacetone solution) in Example 32.

As is clear from the results of FIG. 8, oxidation current was observed in association with dissolution of Mg from the vicinity of 0.3 V, and current density at the vicinity of 1 V was about 15.8 mA/cm$^2$. On the other hand, reduction current was observed in association with deposition of Mg from the vicinity of 1.3 V, and current density at the vicinity of −1.5 V was about −1.2 mA/cm$^2$. Therefore, it has been clarified that by using the electrolytic solution 9, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 33 Measurement of Cyclic Voltammetry (CV) Using the Electrolytic Solution 10

CV measurement was performed similarly as the method in Example 25, except for using the electrolytic solution 10 as the electrolytic solution. Results thereof are shown in FIG. 9.

Figure 9:
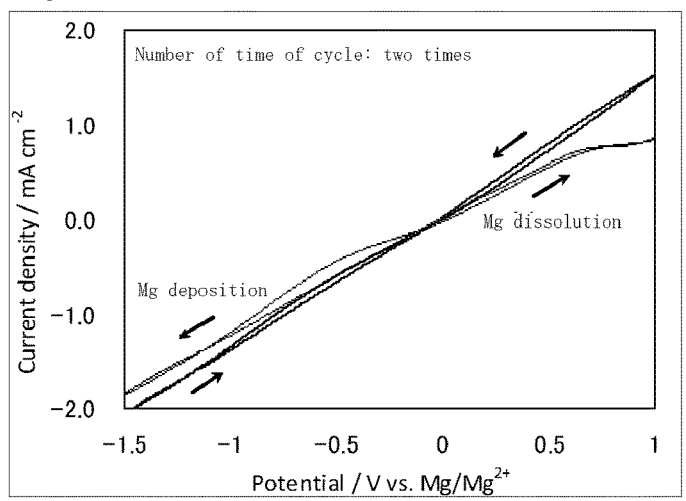
FIG. 9 is a graph showing CV measurement result using the electrolytic solution 10 (Mg(TFSI)$_2$/pyruvic acid solution) in Example 33.

As is clear from the results of FIG. 9, oxidation current was observed in association with dissolution of Mg from the vicinity of 0 V, and current density at the vicinity of 1 V was about 1.5 mA/cm$^2$. On the other hand, reduction current was observed in association with deposition of Mg from the vicinity of 0 V, and current density at the vicinity of −1.5 V was about 2.0 mA/cm$^2$. Therefore, it has been clarified that by using the electrolytic solution 10, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 34 Measurement of Cyclic Voltammetry (CV) Using the Electrolytic Solution 11

CV measurement was performed similarly as the method in Example 25, except for using the electrolytic solution 11 as the electrolytic solution. Results thereof are shown in FIG. 10.

Figure 10:
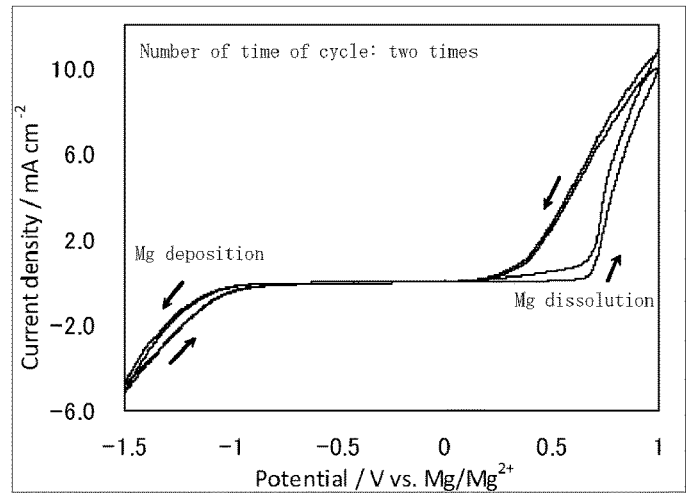
FIG. 10 is a graph showing CV measurement result using the electrolytic solution 11 (Mg(TFSI)$_2$/ethyl acetoacetate solution) in Example 34.

As is clear from the results of FIG. 10, oxidation current was observed in association with dissolution of Mg from the vicinity of 0.7 V, and current density at the vicinity of 1 V was about 10.5 mA/cm$^2$. On the other hand, reduction current was observed in association with deposition of Mg from the vicinity of 0.9 V, and current density at the vicinity of −1.5 V was about 4.7 mA/cm$^2$. Therefore, it has been clarified that by using the electrolytic solution 11, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 35 Measurement of Cyclic Voltammetry (CV) Using the Electrolytic Solution 16

CV measurement was performed similarly as the method in Example 25, except for using the electrolytic solution 16 as the electrolytic solution. Results thereof are shown in FIG. 11.

Figure 11:
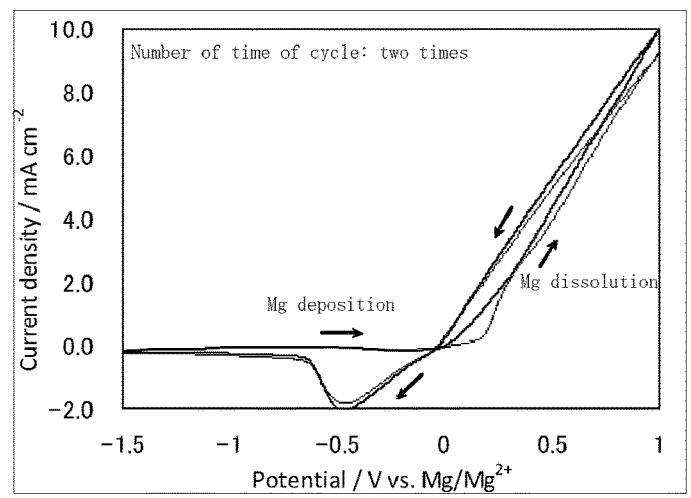
FIG. 11 is a graph showing CV measurement result using the electrolytic solution 16 (MgBr$_2$/methoxyacetone solution) in Example 35.

As is clear from the results of FIG. 11, oxidation current was observed in association with dissolution of Mg from the vicinity of 0.2 V, and current density at the vicinity of 1 V was about 9.8 mA/cm$^2$. On the other hand, reduction current was observed in association with deposition of Mg from the vicinity of 0 V, and current density at the vicinity of −0.5 V was about 2.0 mA/cm$^2$. Therefore, it has been clarified that by using the electrolytic solution 16, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 36 Measurement of Cyclic Voltammetry (CV) Using the Electrolytic Solution 17

CV measurement was performed similarly as the method in Example 25, except for using the electrolytic solution 17 as the electrolytic solution. Results thereof are shown in FIG. 12.

Figure 12:
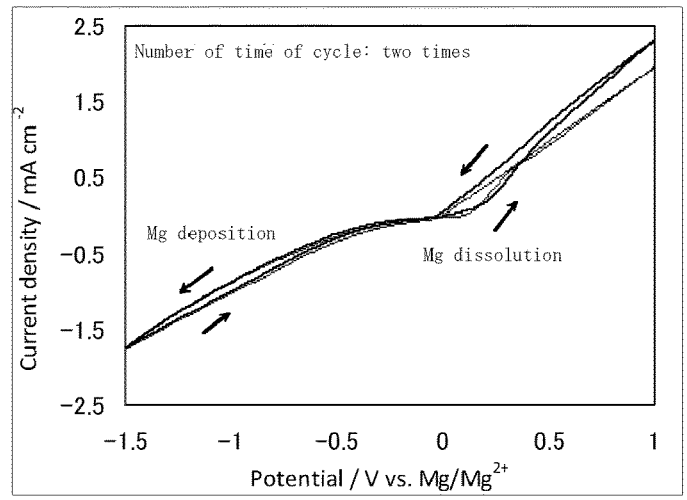
FIG. 12 is a graph showing CV measurement result using the electrolytic solution 17 (MgBr$_2$/ethyl acetoacetate solution) in Example 36.

As is clear from the results of FIG. 12, oxidation current was observed in association with dissolution of Mg from the vicinity of 0.2 V, and current density at the vicinity of 1 V was about 2.3 mA/cm$^2$. On the other hand, reduction current was observed in association with deposition of Mg from the vicinity of −0.2 V, and current density at the vicinity of −1.5 V was about 1.7 mA/cm$^2$. Therefore, it has been clarified that by using the electrolytic solution 17, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 37 Measurement of Cyclic Voltammetry (CV) Using the Electrolytic Solution 19

CV measurement was performed similarly as the method in Example 25, except for using the electrolytic solution 19 as the electrolytic solution. Results thereof are shown in FIG. 13.

Figure 13:
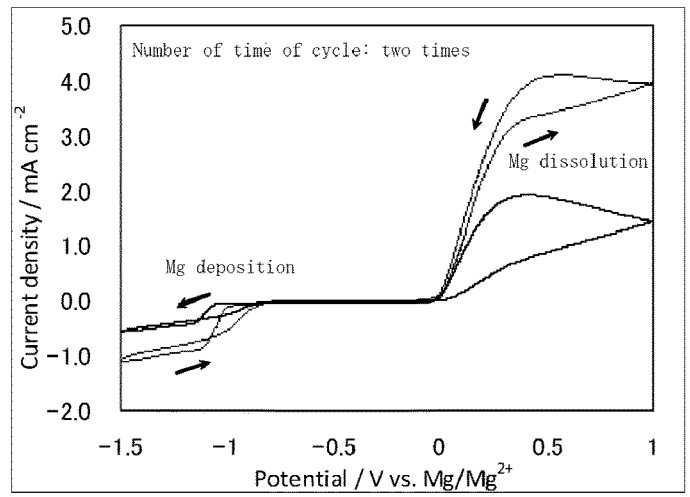
FIG. 13 is a graph showing CV measurement result using the electrolytic solution 19 (MgBr$_2$/3-methoxypropionitrile solution) in Example 37.

As is clear from the results of FIG. 13, oxidation current was observed in association with dissolution of Mg from the vicinity of 0 V, and current density at the vicinity of 1 V was about 4.0 mA/cm$^2$. On the other hand, reduction current was observed in association with deposition of Mg from the vicinity of −0.8 V, and current density at the vicinity of −1.5 V was about 1.0 mA/cm$^2$. Therefore, it has been clarified that by using the electrolytic solution 19, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Example 38 Measurement of Cyclic Voltammetry (CV) Using the Electrolytic Solution 22

CV measurement was performed similarly as the method in Example 25, except for using the electrolytic solution 22 as the electrolytic solution. Results thereof are shown in FIG. 14.

Figure 14:
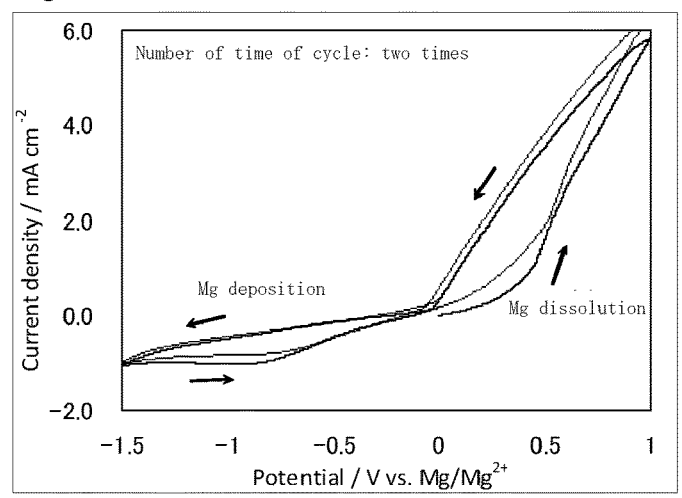
FIG. 14 is a graph showing CV measurement result using the electrolytic solution 22 (Mg(OTf)$_2$/tri(2-methoxyethyl) phosphate solution) in Example 38.

As is clear from the results of FIG. 14, oxidation current was observed in association with dissolution of Mg from the vicinity of 0.1 V, and current density at the vicinity of 1 V was about 6.0 mA/cm$^2$. On the other hand, reduction current was observed in association with deposition of Mg from the vicinity of −0.1 V, and current density at the vicinity of −1.5 V was about 1.0 mA/cm$^2$. Therefore, it has been clarified that by using the electrolytic solution 22, a reversible oxidation-reduction reaction of Mg occurred, and thus gave high current density. Still more, it has also been clarified that dissolution and deposition of Mg progress repeatedly and stably, because decrease in current density was not observed, even in sweep at or subsequent to the second cycle.

Figure 15:
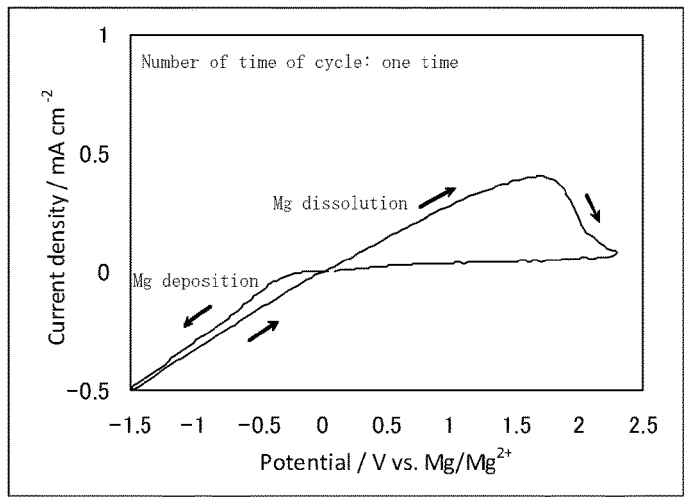
FIG. 15 is a graph showing CV measurement result using the electrolytic solution (BuMgCl/THF solution) in Comparative Example 1.

Comparative Example 1 CV Measurement Using a Butyl Magnesium Chloride (BuMgCl)/Tetrahydrofuran (THF) Solution as an Electrolytic Solution CV measurement was carried out similarly as in the method of Example 25, except for using 2 ml of a THF solution containing 0.5 M of butyl magnesium chloride (BuMgCl) (produced by Kishida Chemical Co., Ltd.) instead of the electrolytic solution 1 and changing the voltage range of −1.5 to 2.0 V. Results thereof are shown in FIG. 15. From the results of FIG. 15, it has been clarified that, when the BuMgCl/THF solution was used as the electrolytic solution, although Mg dissolved and deposited reversibly, current density flowing at that time was very low, and current density at the vicinity of 1.5 V was about 0.4 mA/cm$^2$ and current density at the vicinity of −1.5 V was about −0.5 mA/cm$^2$.

Figure 16:
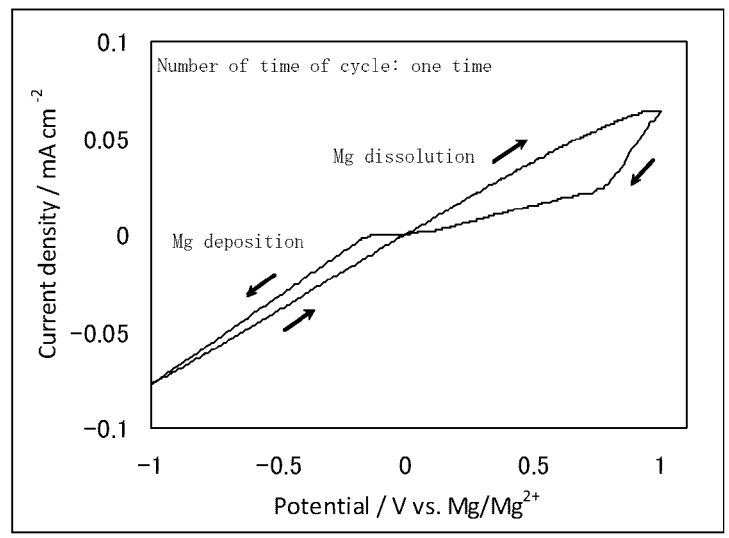
FIG. 16 is a graph showing CV measurement result using the electrolytic solution (PhMgCl/THF solution) in Comparative Example 2.

Comparative Example 2 CV Measurement Using a Phenyl Magnesium Chloride (PhMgCl)/Tetrahydrofuran (THF) Solution as an Electrolytic Solution CV measurement was carried out similarly as in the method of Example 25, except for using 2 ml of a THF solution containing 0.5 M of phenyl magnesium chloride (PhMgCl) (produced by Kishida Chemical Co., Ltd.) instead of the electrolytic solution 1 and changing the voltage range of −1.0 to 1.0 V. Results thereof are shown in FIG. 16. From the results of FIG. 16, it has been clarified that, when the PhMgCl/THF solution was used as the electrolytic solution, current density was further lower as compared with Comparative Example 1, and current density at the vicinity of 1 V was about $6.0 \times 10^{-2}$ mA/cm$^2$ and current density at the vicinity of −1 V was about $-8.0 \times 10^{-2}$ mA/cm$^2$.

Results of oxidation current density and reduction current density of Examples 25 to 38, and Comparative Examples 1 to 2 are shown in following Table 4, together with the electrolytic solutions, the supporting electrolytes in the electrolytic solutions and the solvents used.

Example 39 A Long Period Cycle Test by Measurement of Cyclic Voltammetry (CV) Using the Electrolytic Solution 24

CV measurement was carried out similarly as in the method of Example 25, except for using the electrolytic solution 24, as the electrolytic solution, to evaluate cycle characteristics to 100 cycles. CV sweep range was set at −0.5 to +0.5 V. The results thereof are shown in FIG. 17.

Figure 17:
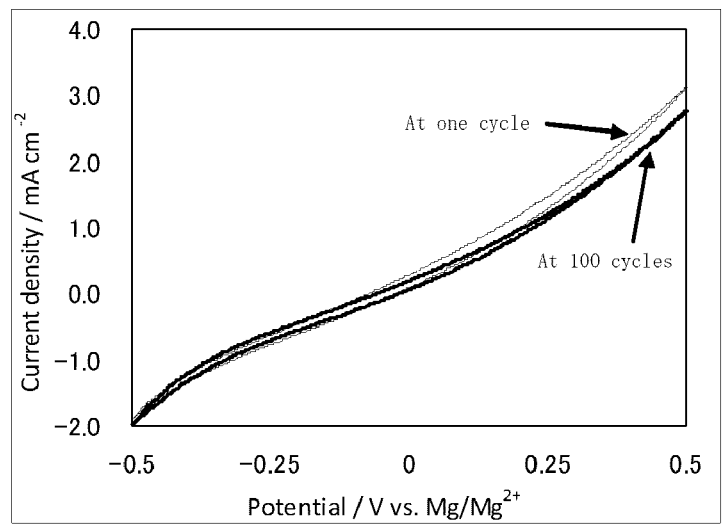
FIG. 17 is a graph showing CV measurement result using the electrolytic solution 24 (Mg(OTf)$_2$/acetylacetone solution) in Example 39.

As is clear from FIG. 17, oxidation current density was 3.0 mA/cm$^2$, and reduction current density was −2.0 mA/cm$^2$, at the initial time cycle, while they were 2.7 mA/cm$^2$ and −2.0 mA/cm$^2$, respectively, after 100 cycles. Accordingly, it has been clarified that the electrolytic solution 24 is an electrolytic solution having high stability superior in a long period cycle characteristics, because of no decrease in current density, even after 100 cycles, by using the electrolytic solution 24.

In comparing Examples 25 to 38 with Comparative Examples 1 to 2, it has been clarified that the Grignard's reagent-type electrolytic solutions used in Comparative Examples 1 and 2 had a current density of ±1 mA/cm$^2$ or lower, while any of the electrolytic solutions of the present invention used in Examples 25 to 38 had higher current density. In addition, it has been clarified that, even in comparison with CV measurement results of the electrolytic solutions based on other than the Grignard's reagent, described in PATENT LITERATURE 3 and 4, they showed clearly higher current values (or current density).

TABLE 4

| Example | Electrolytic solution | Supporting electrolyte | Solvent name | Oxidation current density (/mA·cm$^2$) | Reduction current density (/mA·cm2) |
|---|---|---|---|---|---|
| Example 25 | Electrolytic solution 1 | Mg(TFSI)$_2$ | acetylacetone | 10.8 | −22.6 |
| Example 26 | Electrolytic solution 2 | Mg(TFSI)$_2$ | acetylacetone:acetonitrile (1:1) | 58.6 | −17.1 |
| Example 27 | Electrolytic solution 3 | Mg(TFSI)$_2$ | acetylacetone:propionitrile (1:1) | 22.0 | −19.2 |
| Example 28 | Electrolytic solution 4 | Mg(TFSI)$_2$ | 1,1,1,5,5,5-hexafluoroacetylacetone | 6.2 | −11.3 |
| Example 29 | Electrolytic solution 5 | Mg(TFSI)$_2$ | 3-methyl-2,4-pentanedione | 11.5 | −11.7 |
| Example 30 | Electrolytic solution 6 | Mg(TFSI)$_2$ | 2-acetylcyclohexanone | 1.6 | −2.0 |
| Example 31 | Electrolytic solution 7 | Mg(TFSI)$_2$ | 3,3-dimethyl-2,4-pentanedione | 2.9 | −1.5 |
| Example 32 | Electrolytic solution 9 | Mg(TFSI)$_2$ | methoxyacetone | 15.8 | −1.2 |
| Example 33 | Electrolytic solution 10 | Mg(TFSI)$_2$ | pyruvic acid | 1.5 | −2.0 |
| Example 34 | Electrolytic solution 11 | Mg(TFSI)$_2$ | ethyl acetoacetate | 10.5 | −4.7 |
| Example 35 | Electrolytic solution 16 | MgBr$_2$ | methoxyacetone | 9.8 | −2.0 |
| Example 36 | Electrolytic solution 17 | MgBr$_2$ | ethyl acetoacetate | 2.3 | −1.7 |
| Example 37 | Electrolytic solution 19 | MgBr$_2$ | 3-methoxypropionitrile | 4.0 | −1.0 |
| Example 38 | Electrolytic solution 22 | Mg(OTf)$_2$ | tri(2-methoxyethyl) phosphate | 6.0 | −1.0 |
| Comparative Example 1 | — | n-BuMgCl | tetrahydrofuran | 0.4 | −0.5 |
| Comparative Example 2 | — | PhMgCl | tetrahydrofuran | 0.06 | −0.08 |

In addition, from the results of Example 39, it is inferred that there was no deterioration occurred accompanied with cycles, because of having high current density, even in sweeping at 100 cycles.

From the above results, the electrolytic solution of the present invention is capable of providing the electrochemical device having high current density and superior cycle characteristics.

The invention claimed is:

1. An electrolytic solution for an electrochemical device, comprising
   (1) a supporting electrolyte comprising a magnesium salt,
   (2) at least one or more kinds of the compound represented by following general formula (I), and
   optionally, (3) an organic solvent other than the compound represented by the general formula (I),

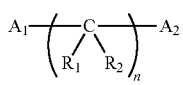
(I)

wherein n represents 1, $R_1$ and $R_2$ each independently represent a hydrogen atom, an alkyl group having 1 to 6 carbon atoms, or a halogenoalkyl group having 1 to 6 carbon atoms, $A_1$ and $A_2$ each independently represent —C(=O)—$R_3$, —O—$R_5$, —C(=O)—$OR_3$, —O—C(=O)—$R_3$, —C(=O)—N($R_4$)—$R_3$, —N($R_4$)—C(=O)—$R_3$, —$SO_2$—$R_3$, —N($R_4$)—$SO_2$—$R_3$, —O—B($OR_5$)$_2$, —O—P(=O)($OR_5$)$_2$, a monocyclic heterocyclic group, a group derived from cyclic acetal, a group derived from a cyclic carbonate ester, or a group derived from a cyclic carboxylate ester, provided that the case wherein $A_1$ and $A_2$ are O—$R_5$, the case wherein $A_1$ is —C(=O)—$R_3$ and $A_2$ is —C(=O)—$OR_3$, the case wherein $A_1$ is —C(=O)—$OR_3$ and $A_2$ is —C(=O)—$R_3$, and the case wherein $A_1$ and $A_2$ are —C(=O)—$OR_3$ are excluded, and a cyclic structure may be formed between $A_1$ and $A_2$, through carbon atom between $A_1$ and $A_2$, or through carbon atom between $A_1$ and $R_1$, $R_3$ represents a hydrogen atom, an alkyl group having 1 to 6 carbon atoms, a halogenoalkyl group having 1 to 6 carbon atoms, an aryl group having 6 to 10 carbon atoms, or an aralkyl group having 7 to 13 carbon atoms, $R_4$ represents a hydrogen atom, an alkyl group having 1 to 6 carbon atoms, a halogenoalkyl group having 1 to 6 carbon atoms, or an aralkyl group having 7 to 13 carbon atoms; and $R_5$ represents an alkyl group having 1 to 6 carbon atoms, a halogenoalkyl group having 1 to 6 carbon atoms, an alkoxyalkyl group having 3 to 8 carbon atoms, an aryl group having 6 to 10 carbon atoms, or an aralkyl group having 7 to 13 carbon atoms, wherein volume ratio of the organic solvent and the compound represented by general formula (I) is 0:100 to 50:50.

2. The electrolytic solution according to claim 1, wherein the supporting electrolyte comprises at least one kind of the magnesium salt represented by following general formula (II);

$$MgX_q \quad (II)$$

wherein Mg represents magnesium ion, q represents 1 or 2, when q is 1, X represents oxide ion ($O^{2-}$), sulfide ion ($S^{2-}$), sulfate ion ($SO_4^{2-}$), hydrogen phosphate ion ($HPO_4^{2-}$), or carbonate ion ($CO_3^{2-}$), which is a divalent anion, when q is 2, X represents a perfluoroalkanesulfonate ion having 1 to 4 carbon atoms, a bis(perfluoroalkanesulfonyl)imide ion represented by following general formula (III)

(III)

wherein k represents an integer of 1 to 4, F represents fluorine atom, a bis(perfluoroalkanesulfonyl)methide ion represented by following general formula (IV)

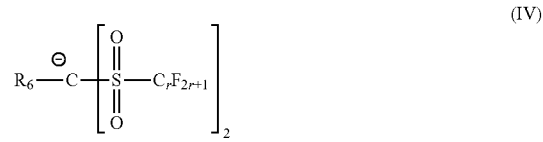
(IV)

wherein r represents an integer of 1 to 4, $R_6$ represents an alkyl group having 1 to 4 carbon atoms, or a —$SO_2$—$C_rF_{2r+1}$ group, in which r is the same as the above-described one, a bis(fluorosulfonyl)imide ion, an alkane sulfonate ion having 1 to 4 carbon atoms, an arene sulfonate ion having 6 to 10 carbon atoms, a perfluoroalkane carboxylate ion having 2 to 5 carbon atoms, an alkane carboxylate ion having 2 to 5 carbon atoms, an arene carboxylate ion having 7 to 11 carbon atoms, an alkoxide ion having 1 to 4 carbon atoms, permanganate ion, perchlorate ion, tetraphenylborate ion, tetrafluoroborate ion, hexafluorophosphate ion, hexafluoroarsenate ion, nitrate ion, dihydrogen phosphate ion, hydrogen sulfate ion, hydrogen carbonate ion, hydrogen sulfide ion, hydroxide ion ($OH^-$), thiocyanate ion, cyanide ion ($CN^-$), fluoride ion ($F^-$), chloride ion ($Cl^-$), bromide ion ($Br^-$), iodide ion ($I^-$), or hydride ion ($H^-$), which is a monovalent anion.

3. The electrolytic solution according to claim 2, wherein q in the general formula (II) represents 2, and X in the general formula (II) represents a perfluoroalkanesulfonate ion having 1 to 4 carbon atoms, a bis(perfluoroalkanesulfonyl)imide ion represented by the above general formula (III), bis(fluorosulfonyl)imide ion, a perfluoroalkanecarboxylate ion having 2 to 5 carbon atoms, an alkoxide ion having 1 to 4 carbon atoms, tetraphenylborate ion, tetrafluoroborate ion, hexafluorophosphate ion, perchlorate ion, fluoride ion, bromide ion, chloride ion, or iodide ion.

4. The electrolytic solution according to claim 3, wherein X represents a perfluoroalkanesulfonate ion having 1 to 4 carbon atoms, bromide ion, chloride ion, or iodide ion.

5. The electrolytic solution according to claim 1, wherein the concentration of the supporting electrolyte is 0.1 to 5.0 mol/L.

6. The electrolytic solution according to claim 1, wherein the organic solvent comprises at least one kind selected from an ether solvent, an alcohol solvent, a carbonate solvent, an ester solvent, a nitrile solvent, a sulfone solvent, a halogen solvent, a hydrocarbon solvent, and ionic liquid.

7. The electrolytic solution according to claim 1, wherein the organic solvent is dimethoxyethane, 2-methyltetrahydrofuran, diethylene glycol dimethyl ether, propylene carbonate, acetonitrile, butyrolactone, ethanol, ethyl acetate, propionitrile, 1-ethyl-3-methylimidazolium trifluoromethanesulfonate or tetraethylammonium trifluoromethanesulfonate.

8. An electrochemical device comprising the electrolytic solution according to any one of claims 1 to 5, 6 and 7, a positive electrode, a negative electrode and a separator.

9. The electrolytic solution according to claim 1, wherein $A_1$ and $A_2$ each independently represent —C(=O)—$R_3$, —O—$R_5$, or —C(=O)—$OR_3$, provided that the case wherein $A_1$ and $A_2$ are —O—$R_5$, the case wherein $A_1$ is —C(=O)—$R_3$ and $A_2$ is —C(=O)—$OR_3$, the case wherein $A_1$ is —C(=O)—$OR_3$ and $A_2$ is —C(=O)—$R_3$, and the case wherein $A_1$ and $A_2$ are —C(=O)—$OR_3$ are excluded.

10. The electrolytic solution according to claim 1, wherein the compound represented by the general formula (I) is the compound represented by the following general formula (I-I);

(I-I)

wherein n represents 1, $R_{11}$ and $R_{21}$ each independently represent a hydrogen atom or an alkyl group having 1 to 6 carbon atoms, and $A_{11}$ and $A_{21}$ each independently represent —C(=O)—$R_{31}$, —O—$R_{51}$, —C(=O)—$OR_{31}$, or —O—P(=O)($OR_{51})_2$, $R_{31}$ represents a hydrogen atom or an alkyl group having 1 to 6 carbon atoms, $R_{51}$ represents an alkyl group having 1 to 6 carbon atoms, provided that the case wherein $A_{11}$ and $A_{21}$ are —O—$R_{51}$, the case wherein $A_{11}$ is —C(=O)—$R_{31}$ and $A_{21}$ is —C(=O)—$OR_{31}$, the case wherein $A_{11}$ is —C(=O)—$OR_{31}$ and $A_{21}$ is —C(=O)—$R_{31}$, and the case wherein $A_{11}$ and $A_{21}$ are —C(=O)—$OR_{31}$ are excluded, and a cyclic structure may be formed by $A_{11}$, $R_{11}$ and carbon located between them.

11. The electrolytic solution according to claim 10, wherein $A_{11}$ and $A_{21}$ each independently represent —C(=O)—$R_{31}$, —O—$R_{51}$, or —C(=O)—$OR_{31}$, provided that the case wherein $A_{11}$ and $A_{21}$ are —O—$R_{51}$, the case wherein $A_{11}$ is —C(=O)—$R_{31}$ and $A_{21}$ is —C(=O)—$OR_{31}$, the case wherein $A_{11}$ is —C(=O)—$OR_{31}$ and $A_{21}$ is —C(=O)—$R_{31}$, and the case wherein $A_{11}$ and $A_{21}$ are —C(=O)—$OR_{31}$ are excluded.

12. The electrolytic solution according to claim 1, wherein $R_1$ represents a hydrogen atom and $R_2$ represents a hydrogen atom, an alkyl group having 1 to 6 carbon atoms, or a halogenoalkyl group having 1 to 6 carbon atoms.

13. The electrolytic solution according to claim 1, wherein $R_1$ represents a hydrogen atom and $R_2$ represents a hydrogen atom, or an alkyl group having 1 to 6 carbon atoms.

14. The electrolytic solution according to claim 1, wherein the compound represented by the general formula (I) is acetylacetone, 1,1,1,5,5,5-hexafluoroacetylacetone, 3-methyl-2,4-pentanedione, 2-acetylcyclohexanone, 3,3-dimethyl-2,4-pentanedione, or methoxyacetone.

15. The electrolytic solution according to claim 1, wherein the compound represented by the general formula (I) is acetylacetone, 1,1,1,5,5,5-hexafluoroacetylacetone, 3-methyl-2,4-pentanedione, or methoxyacetone.

* * * * *